United States Patent
Carney

[11] Patent Number: 6,076,557
[45] Date of Patent: Jun. 20, 2000

[54] THIN WALL, HIGH PRESSURE, VOLUME COMPENSATOR

[75] Inventor: Thomas James Carney, West Chicago, Ill.

[73] Assignee: Senior Engineering Investments AG, Switzerland

[21] Appl. No.: 09/097,133

[22] Filed: Jun. 12, 1998

[51] Int. Cl.[7] .................................................. F16L 55/04
[52] U.S. Cl. ............................................ 138/30; 138/31
[58] Field of Search ........................................ 138/30, 31

[56] References Cited

U.S. PATENT DOCUMENTS

| | | | |
|---|---|---|---|
| 1,974,323 | 9/1934 | Allen | 138/30 |
| 2,233,804 | 3/1941 | Bourne | 181/59 |
| 2,411,315 | 11/1946 | Ashton | 138/31 |
| 2,688,984 | 9/1954 | Snyder | 138/31 |
| 2,817,361 | 12/1957 | Mercier | 138/31 |
| 2,852,033 | 9/1958 | Orser | 138/30 |
| 2,904,077 | 9/1959 | Trumper | 138/30 |
| 2,963,044 | 12/1960 | Hellund | 138/30 |
| 2,967,744 | 1/1961 | Davies | 309/2 |
| 2,968,318 | 1/1961 | Bauman | 138/26 |
| 3,061,039 | 10/1962 | Peters | 181/42 |
| 3,063,470 | 11/1962 | Forster | 138/30 |
| 3,066,701 | 12/1962 | Rothenbert et al. | 138/30 |
| 3,075,576 | 1/1963 | Herbert | 138/30 |
| 3,076,479 | 2/1963 | Ottung | 138/30 |
| 3,159,182 | 12/1964 | Peters | 138/30 |
| 3,162,213 | 12/1964 | Peters | 138/30 |
| 3,534,884 | 10/1970 | Suter | 138/30 |
| 3,550,634 | 12/1970 | Kupiec | 138/26 |
| 3,842,863 | 10/1974 | Ghiotto | 138/30 |
| 4,064,911 | 12/1977 | Albrecht | 138/30 |
| 4,121,812 | 10/1978 | Dousset | 267/35 |
| 4,129,324 | 12/1978 | Jones, Jr. | 285/107 |
| 4,134,490 | 1/1979 | Turillon et al. | 206/7 |
| 4,134,491 | 1/1979 | Turillon et al. | 206/7 |
| 4,206,902 | 6/1980 | Barthel et al. | 138/89 |
| 4,367,786 | 1/1983 | Häfner et al. | 165/10 |
| 4,500,487 | 2/1985 | Christie et al. | 376/283 |
| 4,523,612 | 6/1985 | Kuklo | 138/130 |
| 4,997,009 | 3/1991 | Niikura et al. | 138/30 |
| 5,575,262 | 11/1996 | Rohde | 123/467 |
| 5,682,923 | 11/1997 | Goloff et al. | 138/30 |

FOREIGN PATENT DOCUMENTS

| | | |
|---|---|---|
| 39709/78 | 3/1980 | Australia . |
| 509344 | 10/1992 | European Pat. Off. . |
| 1 264 893 | 3/1968 | Germany . |
| 50-126659 | 4/1977 | Japan . |
| 53-55252 | 11/1979 | Japan . |
| 58-167530 | 4/1985 | Japan . |
| 64-159166 | 2/1991 | Japan . |
| 4-250285 | 4/1994 | Japan . |
| 750 210 | 7/1980 | Russian Federation . |
| 1 252 602 | 8/1986 | Russian Federation . |
| 1 281 806 | 1/1987 | Russian Federation . |
| 2143 | of 1886 | United Kingdom . |
| 817874 | 8/1959 | United Kingdom . |
| 1096319 | 12/1967 | United Kingdom . |
| 1197524 | 7/1970 | United Kingdom . |

OTHER PUBLICATIONS

Senior Engineering brochure titled *Welded Diaphragm Metal Bellows*, dated Jul. 1997.

Standards of the Expansion Joint Manufacturers Association, Inc.; Expansion Joint Manufacturers Association, Inc.; Sec. C, Issue 1, p. 91, dated Jan. 1985.

*Primary Examiner*—James Hook
*Attorney, Agent, or Firm*—Dick and Harris

[57] ABSTRACT

Accumulators/compensators for pressurized fluent material systems are provided, in which a continuous substantially non-permeable, flexible membrane (like a bellows) surrounds or is surrounded by a non-gaseous support medium, all within a surrounding housing. Various combinations of support media, which may include internal gas-filled cavities, are described and illustrated.

32 Claims, 17 Drawing Sheets

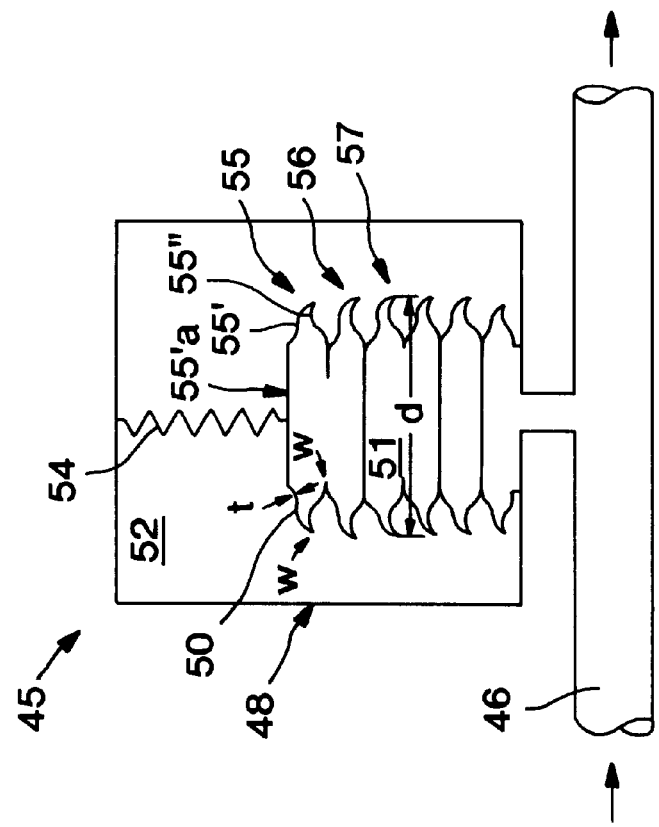
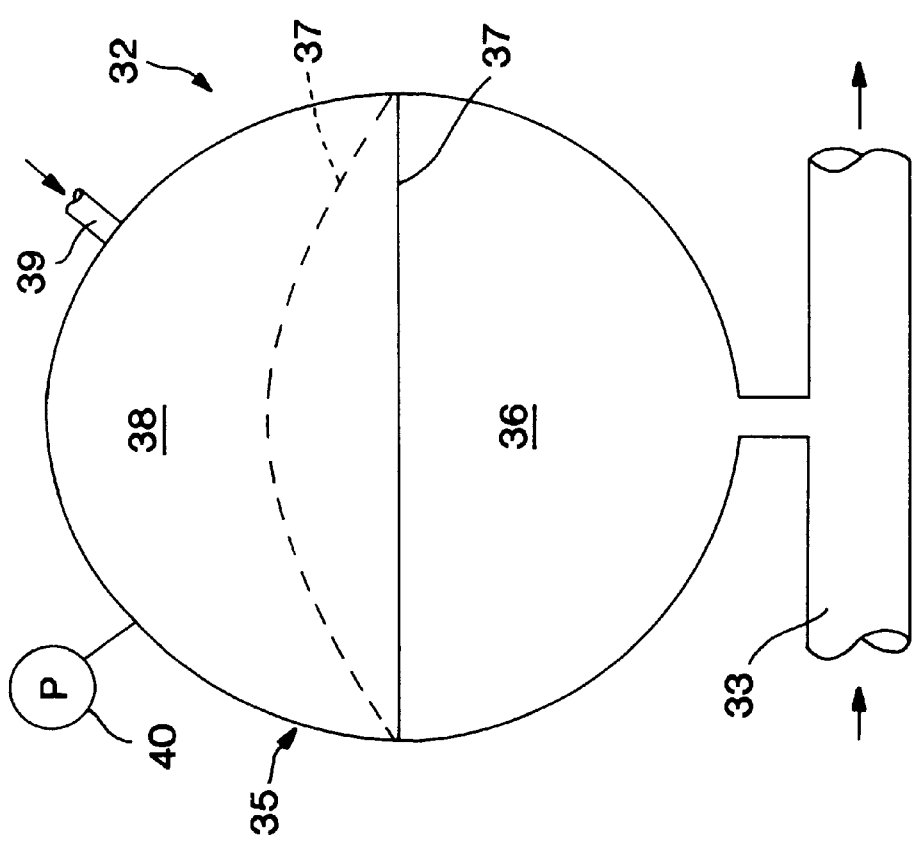
FIG. 2 PRIOR ART
FIG. 1 PRIOR ART

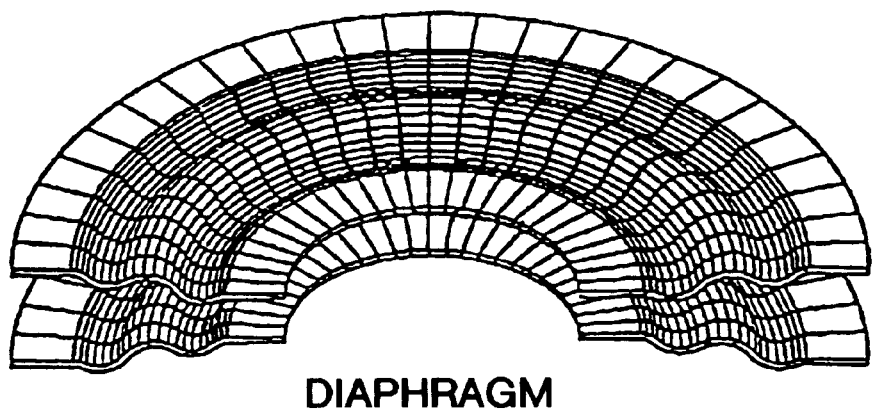
DIAPHRAGM
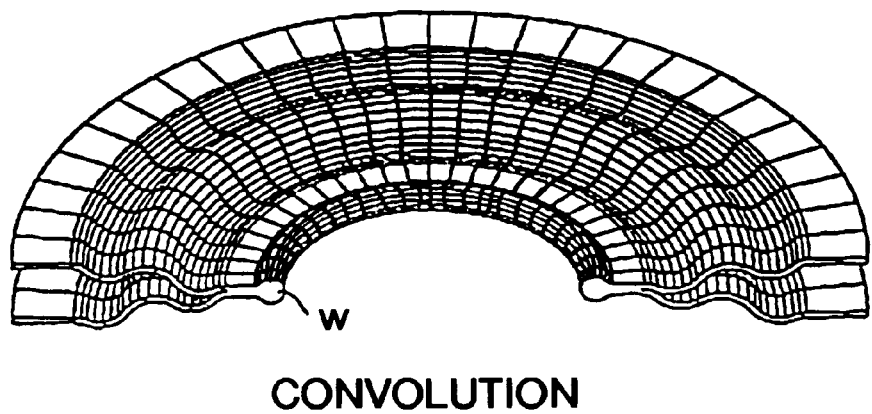
CONVOLUTION
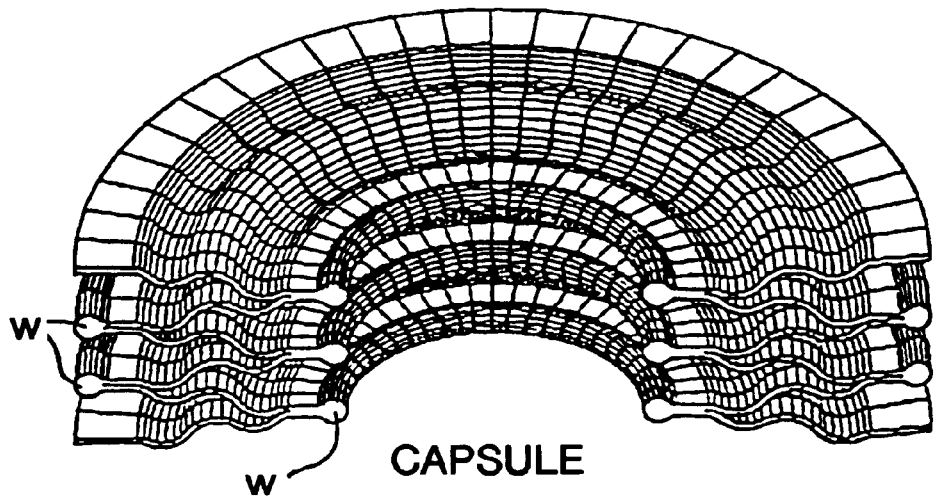
CAPSULE
FIG. 3a
PRIOR ART

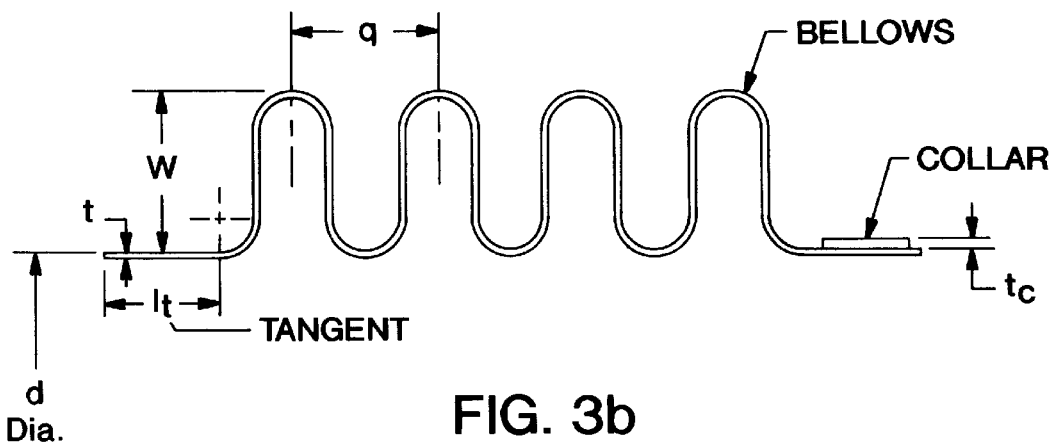
FIG. 3b
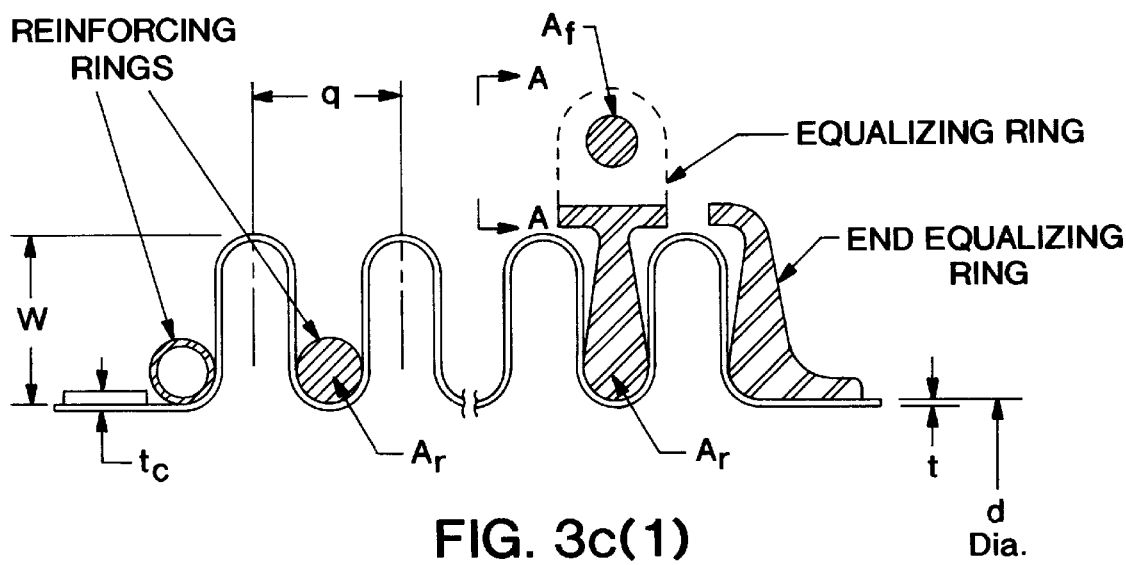
FIG. 3c(1)
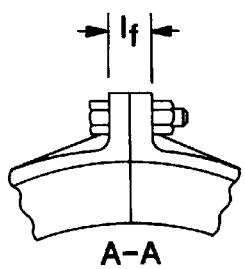
FIG. 3c(2)

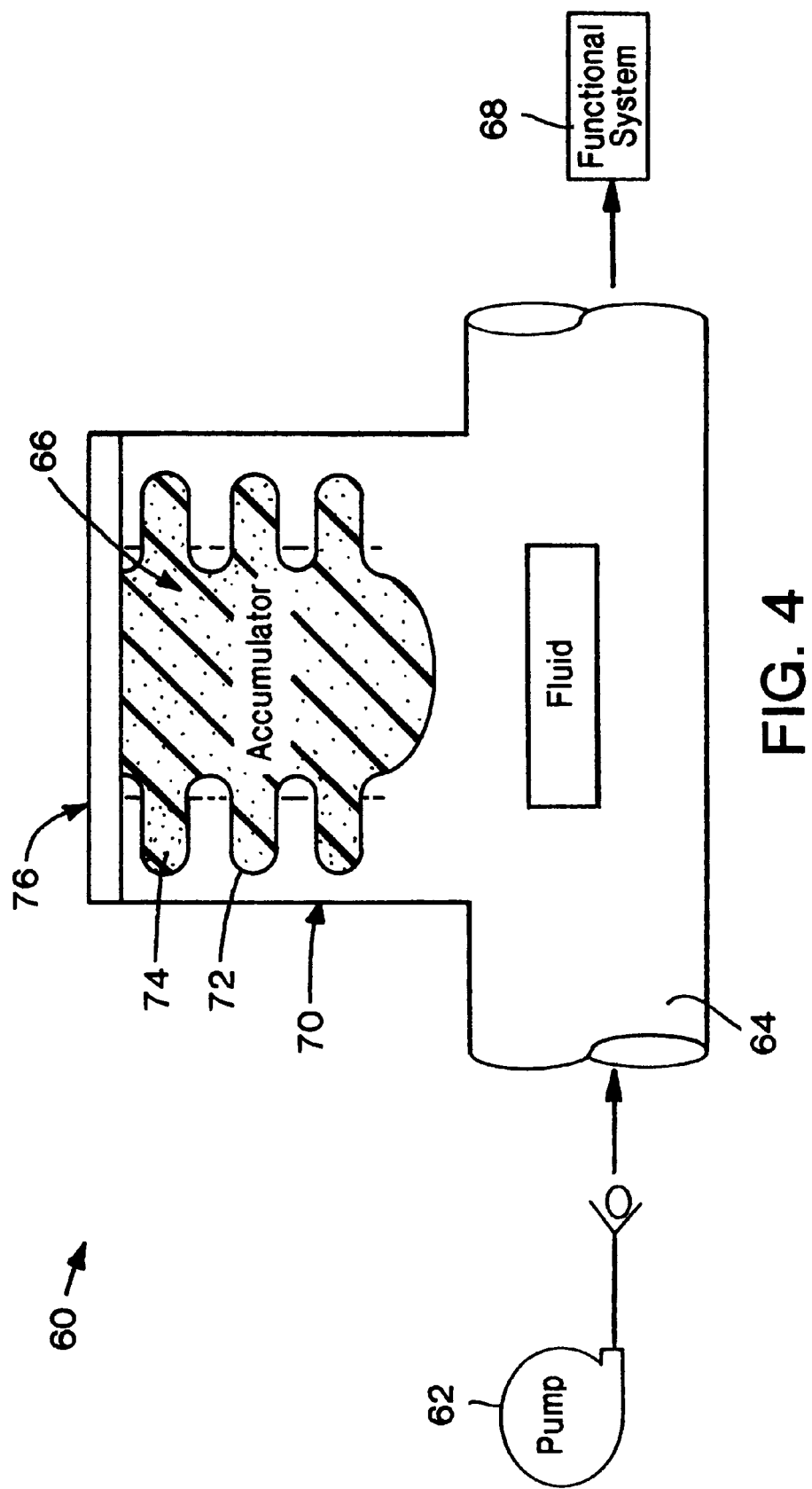

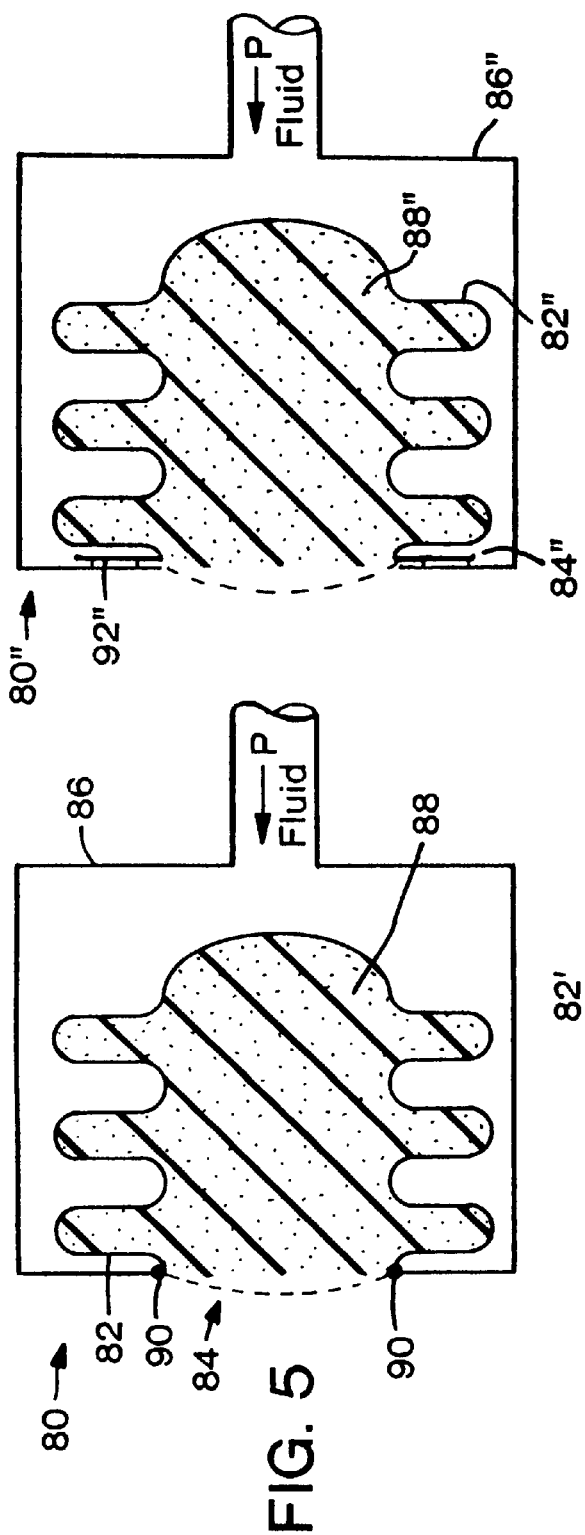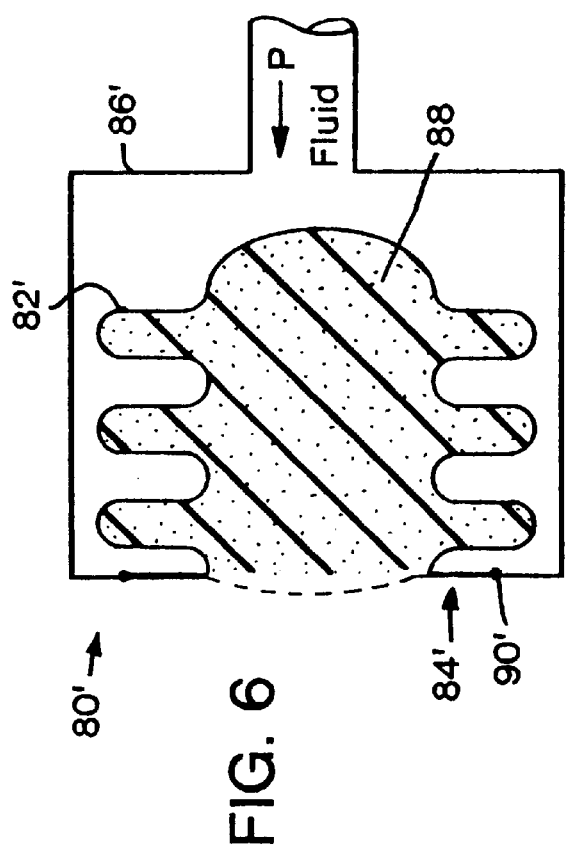
FIG. 7
FIG. 5
FIG. 6

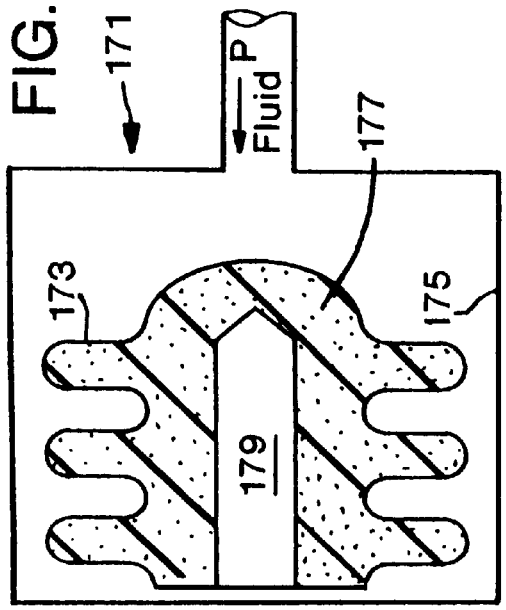
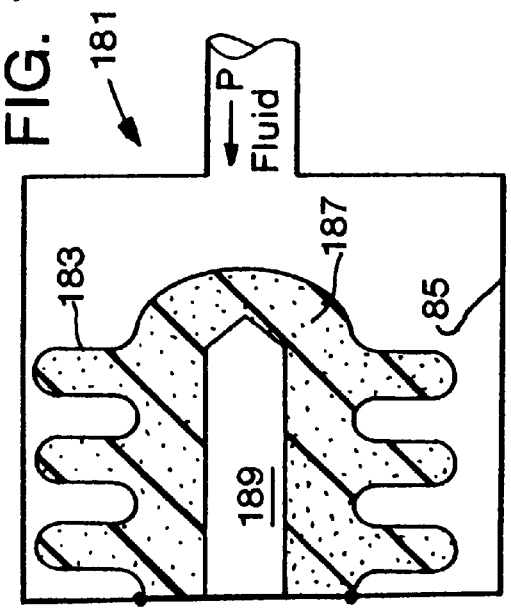
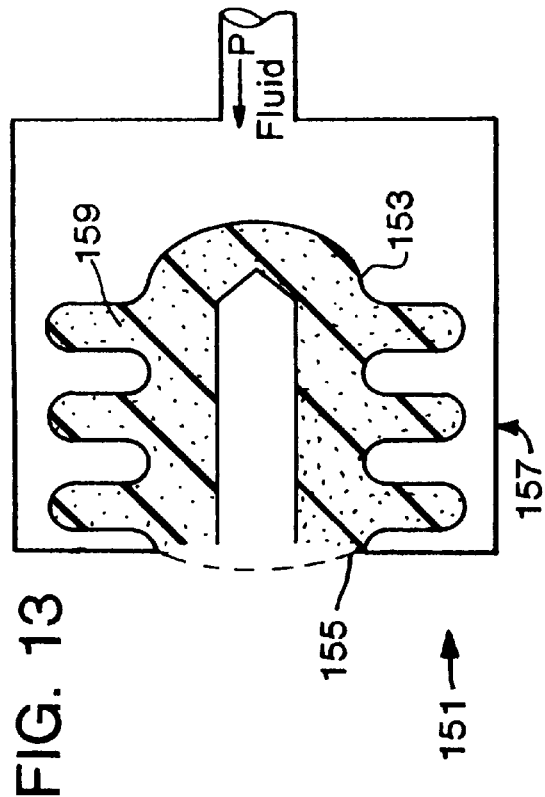
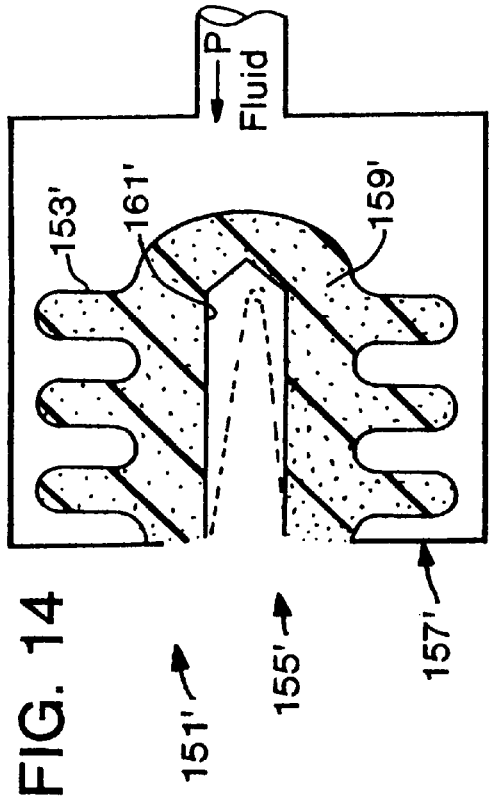

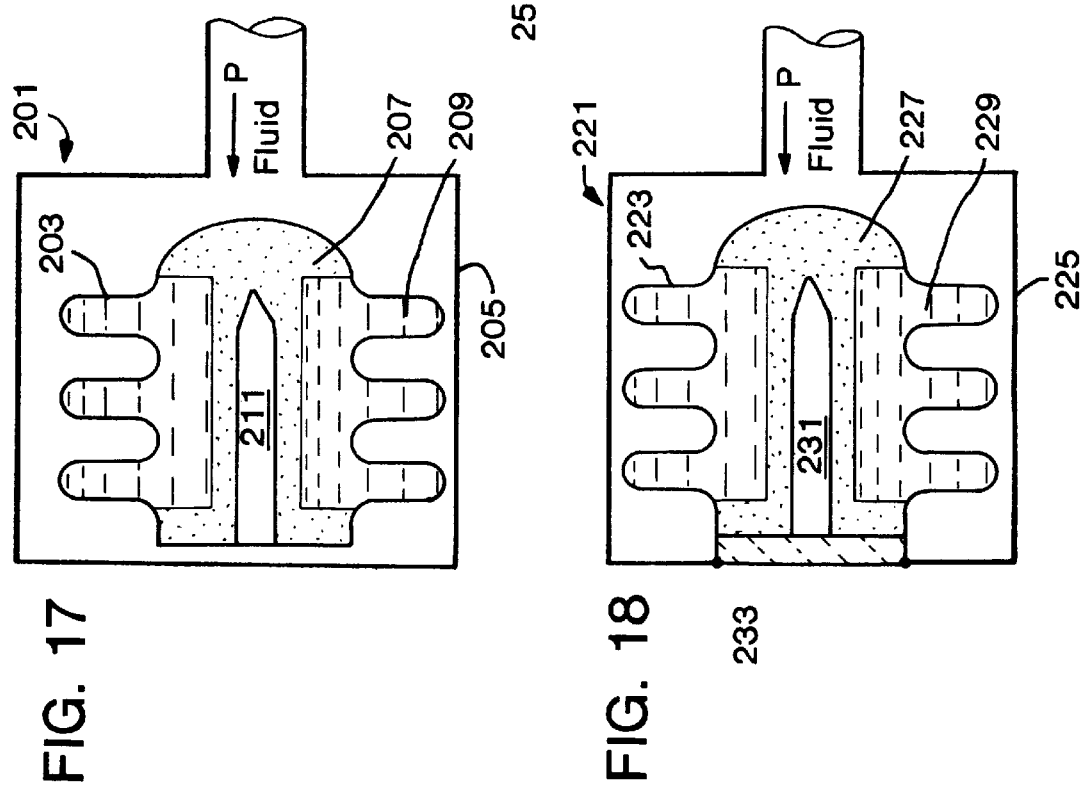

Example of Accumulator/Compensator in system without any housing.

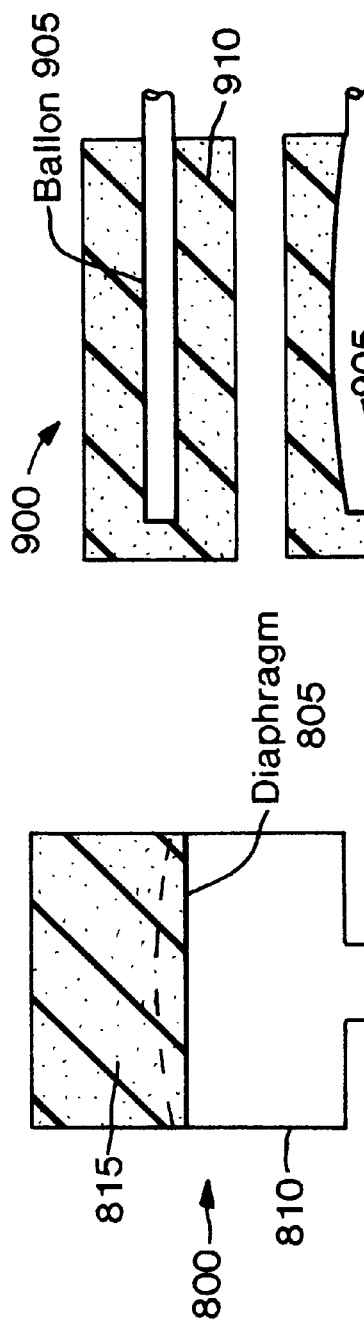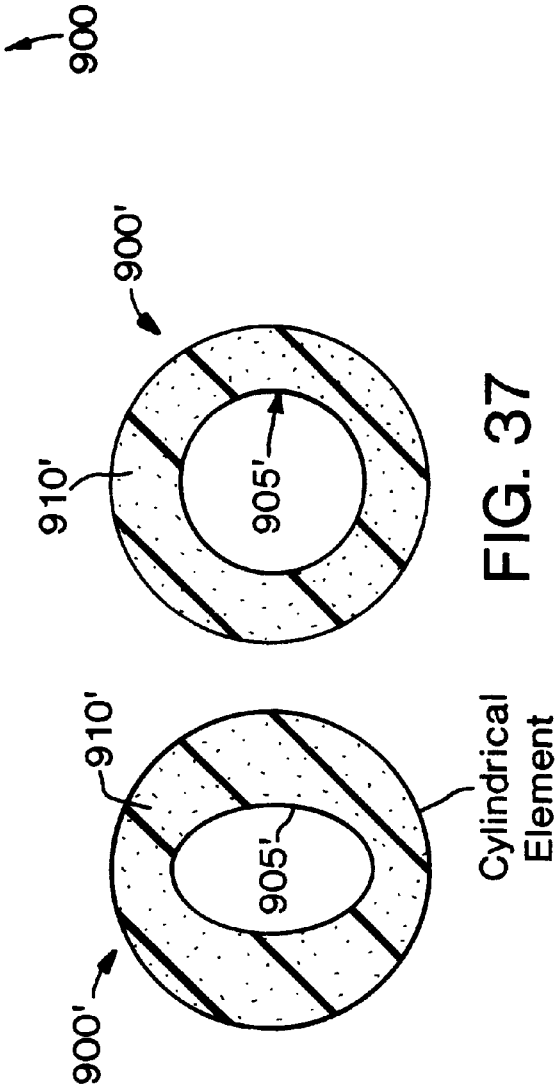

ic fluid lines or other
THIN WALL, HIGH PRESSURE, VOLUME COMPENSATOR

BACKGROUND OF THE INVENTION

1. Field of the Invention

The present invention relates to accumulators/compensators for pressurized fluent material lines (wherein the fluent material may be a gas, a liquid, a slurry or even a finely particulate material), such as may be found in heavy machinery, such as earth moving equipment, or other machines which incorporate hydraulpressurized lines.

2. The Prior Art

High pressure fluent material systems, for example hydraulic power transmission lines, brake fluid transmission lines and the like, typically operate in pressure ranges from a few hundreds to several thousands of pounds per square inch. Such fluent material transmission systems can be subjected from time to time to rapid pressure fluctuations which may be of substantial amplitude and frequency. An example of such fluctuations exists in the fluent material transmission systems associated with ABS braking systems which pulsate rapidly during hard braking.

In such high pressure fluent material systems, it is known to connect to the pressurized fluent material line a device called an accumulator or compensator. The function of the accumulator/compensator is to absorb temporary spikes in the line pressure toward evening out the pressure at the "end" of the pressurized fluent material line and to prevent possible damage to or blow-out of the pressurized fluent material transmission line.

The operation of any non-preloaded accumulator-compensator is that as soon as a pressure differential develops across the membrane or shell, some slight deflection of the membrane or shell will occur. Depending upon the stiffness of the system, the deflection may be so small, even under substantial pressure differentials, as to be virtually undetectable. Alternatively, if the system is not very stiff, measurable deflection may occur with even relatively small pressure differentials.

FIGS. 1 and 2 illustrate known prior art accumulator/compensator constructions.

In FIG. 1, a diaphragm- or bladder-type accumulator/compensator is shown. Diaphragm-type accumulator 32 typically would be connected by any suitable type of fluid connection to a pressurized fluent material line 33. Accumulator 32 typically comprised a shell 35, the interior space of which is substantially bisected by a flexible elastic diaphragm 37. Typically, diaphragm 37 would be manufactured from rubber, elastic, plastic, metal or the like. On the side of the diaphragm that is not exposed to the pressurized fluent material 38, air or other gas will be pumped in through inlet 39. A pressure gauge 40 may also be connected to space 38 in order to determine the static pressure of the air or other gas pumped into space 38. Typically, accumulator 32 will be calibrated so that during steady state operating conditions, space 36 will fill with the pressurized fluent material and the pressure of the gas in space 38 will be such that diaphragm 37 will be unextended as indicated by the solid line in FIG. 1. If a sudden spike in the pressure of the fluent material in line 33 is encountered, bladder 37 will distend and stretch to absorb the additional pressure force and fluent material volume, as indicated by the dotted line.

Such diaphragm type accumulators are typically suited only for relatively low pressure applications when constructed of metal and somewhat higher pressure applications (5000 psi) when constructed of rubber. That is, a metal diaphragm is not capable of accommodating deflection magnitudes and/or cycling required of higher pressure systems, before failure, while a rubber diaphragm (if backed by a pressurized gas), can withstand greater magnitude deflections and cycling. However, in the latter case the materials from which the diaphragms 37 are manufactured typically are somewhat porous relative to the fluent materials being transmitted in line 33 so that some leakage of the fluent material directly through the membrane may occur. Also, elastomeric natural or artificial rubber or plastic diaphragms sometimes may be subject to direct chemical attack by the fluent materials being transmitted in line 33.

FIG. 2 illustrates another known configuration of pressurized line accumulator/compensator. Accumulator 45, which may be connected to line 46 by any suitable fluid connection, incorporates a housing 48 (schematically illustrated as a simple box, but understood to have a configuration of any conventional design dictated by the requirements of the specific application). Housing 48 will include a metal bellows structure 50 closed at one end and opened at the other end to the connection to fluent material line 46, dividing the interior of housing 48 into two spaces, interior of bellows 51 and exterior of bellows 52. Typically, the open end of the bellows will be affixed to the housing surrounding the connection to the fluent material line in a sealing manner, e.g., welding, etc., so as to preclude escape of the pressurized fluent material from the interior region 51 to the exterior region 52. A biasing mechanism, represented in FIG. 2 schematically by spring symbol 54, may be connected to the movable end of bellows 50 in order to provide resistive biasing of the bellows in order to, for example, place a tensile or compressive pre-load on the bellows. In addition, the space 52 between the bellows 50 and the housing 48 may be filled with a pressurized gas in a manner similar to that described with respect to the prior art embodiment of FIG. 1.

The bellows used in the accumulator 45 of FIG. 2 have been typically fabricated with a specialized bellows construction, as shown in magnified detail in FIG. 3a.

Bellows 50 may be provided with convolutions 55, 56, 57, etc. (see FIG. 2). Each convolution, for example, convolution 55, may be formed from two contoured diaphragms 55' and 55". In order to give the bellows 50 sufficient strength and flexibility to undergo repeated cycles of expansion and compression, as a result of the forces exerted on the interior 51 by the pressurized fluent material and on the exterior 52 by the biasing mechanism 54 and/or the presence of any pressurized gas within space 52, bellows 50 is constructed from a plurality of discreet diaphragm members connected to one another by welding, etc. For example, as previously indicated, convolution 55 is comprised of diaphragm 55' and diaphragm 55". Welds are provided at the outer radially edges and inner radially edges of each diaphragm (designated by W in FIGS. 2 and 3a). The just described construction enables the bellows to accommodate relatively large steady state pressurized fluent material pressures (above 8000 psi typ.) and relatively large fluctuations of the pressure in the pressurized fluent material (0 to system max. psi, typ.) as well as relatively large magnitude cycles of compression and extension of the bellows itself. The pressure drop across the bellows is relatively small due to the pressurized gas in space 52. In addition, the particular cross sectional configuration of the bellows permits compression of the bellows diaphragms against one another so that the overall thickness of the compressed bellows is the actual thickness of the individual convolution diaphragms summed.

However, such prior art metal bellows accumulator constructions incur, of necessity, substantial costs in terms of actual material used as well as in the fabrication efforts required to manufacture such accumulators, including pressurized canisters as well as the specialized shaping of the individual convolutions and the requirement for welds at each connection between individual diaphragm members.

FIGS. 3b and 3c illustrate additional prior art methods, which have been used for reinforcing thin-walled bellows. FIG. 3b illustrates a thin-walled bellows which is unreinforced. The bellows may be defined by a variety of characteristics, including: the nominal diameter, d; the thickness, t; the amplitude of the convolutions, W; the length of the neck, $I_t$; support collar (for attachment to pipes) thickness, $t_c$; and wavelength of the convolutions, q. Generally, the thicker the bellows wall is, the stiffer it is and the greater the overall strength is. However, as the wall thickness increases, so does the susceptibility of the wall to high displacement bending fatigue. As the bellows undergoes cycling, through either extension and compression, or bending, localized buckling will ultimately occur with the time required in inverse proportion to the wall thickness. Accordingly, if a high displacement high cycling frequency must be accommodated, in order to reduce the wall thickness, the bellows must be reinforced, by reinforcing rings and/or equalizing rings, as shown in FIG. 3c.

However, such prior art metal bellows accumulator constructions incur, of necessity, substantial costs in terms of actual material used as well as in the fabrication efforts required to manufacture such bellows, including the specialized shaping of the rings and the requirement for forming the bellows with the rings on or splitting the rings for assembly. In addition, the relatively large thickness to diameter ratio (of thickened bellows), makes these bellows construction susceptible to fatigue from numerous extensions and compressions, and/or overly rigid and unresponsive to rapid system fluent material pressure fluctuations. Reinforced thin-walled bellows also suffer from the potential drawback that the reinforcement is not continuous, but is focused only in specific regions of the bellows. Such constructions are suitable for expansion joints where the reacting forces are predominantly axial. However, in accumulator/compensator applications, the predominant pressure forces act in all directions which requires continuous support along the membrane.

An oscillation damping construction is illustrated in Rohde, U.S. Pat. No. 5,575,262. The device of the Rohde '262 reference is a damper for the fuel circulation circuit of an internal combustion engine. A structure is positioned within the fuel distributor of a fuel injection system, which is fabricated from a resilient material, and has a plurality of gas-filled chambers. The chambers are positioned proximate the injector valves. Localized transient elevations in pressure of the fuel cause the gas-filled chambers to be temporarily compressed, to absorb and dampen such oscillations. The apparatus of the Rohde '262 reference is not configured for compensating for gross localized increases in fluent material volume; neither is it configured to provide an accumulator function, to act as a capacitor, to return stored energy to a fluent material system. Further, since only gas is used to support the resilient material, the apparatus of the Rohde '262 reference is not configured for high pressure systems or situations with large pressure differentials across the thickness of the resilient material.

It would be desirable to provide an accumulator/compensator construction that is capable of accommodating fluctuations in pressure in pressurized fluent material lines over a broad range of steady state operating pressures, especially high pressures.

It would also be desirable to provide a accumulator/compensator for pressurized fluent material systems which is capable of accommodating large variations present in a pressurized fluent material line while using relatively conventional constructions that are simpler and less expensive than prior art constructions for accumulator/compensators.

It would further be desirable to provide an accumulator/compensator which can handle relatively high pressures and/or high volume compensation.

Also, it would be desirable to provide an accumulator/compensator which is non-permeable and physically and/or chemically inert to the pressurized system fluent materials, and which can accommodate flowable materials such as liquids, gases and slurries.

These and other objects of the invention will become apparent in light of the present specification, claims and drawings.

SUMMARY OF THE INVENTION

The present invention is an accumulator/compensator apparatus for accommodating pressure fluctuations in a pressurized fluent material system. The accumulator/compensator apparatus may comprise, in part, a discrete housing, operably configured to be connected, in communication with the system fluent material of a pressurized fluent material system. Alternatively, the accumulator may simply be located in a region, already existing in the fluent material system, at which location an accumulator/compensator may be advantageously positioned, or plugged in, such as a system fluent material reservoir, or even a location in the line, for example a wide spot in a straight run of line, or a bend in the line (see, e.g. FIG. 27). A substantially non-permeable, flexible membrane (SNF), such as a bellows, is operably disposed within the housing or other location, to have a surface in contact with the pressurized system fluent material of the pressurized fluent material system, so that upon occurrence of a pressure differential across the SNF membrane, caused by a change in the pressure of the system fluent material, the SNF membrane will be prompted to undergo a change in dimension in response to the pressure fluctuation in the system fluent material contacting the surface of the SNF membrane. By "substantially non-permeable, flexible" it is intended that, under the kinds of operating conditions (system pressures and materials being used) which are expected to be encountered by accumulators/compensators of the present invention, the system fluent materials encountered typically will not be able to pass through the membrane and come into contact with the support media, and the membrane will be flexible and prompted to be compressed, extended or otherwise deformed in response to encountering predetermined pressure regimes.

At least one non-gaseous support medium is operably disposed in operable contact with the SNF membrane, for providing yielding resistance to dimensional change by the SNF membrane in response to said pressure fluctuations of the system fluent material.

According to one embodiment of the invention, the substantially continuously formed SNF membrane comprises an open-ended bellows membrane structure, operably disposed substantially adjacent an opening in the housing, so that the open end of the bellows structure is exposed to ambient atmospheric conditions. Preferably, the at least one non-gaseous support medium comprises a compressible, substantially self-supporting material. One or more cavities may be disposed in the support medium.

Alternatively, the at least one non-gaseous support medium comprises an incompressible, flowable, substantially self-supporting constant volume material. A cavity may be disposed in the support medium. The at least one non-gaseous support medium may comprise one or more of the following materials: a liquid; a slurry.

According to an alternative embodiment of the invention, the substantially continuously formed SNF membrane comprises a closed-ended bellows membrane structure, operably disposed within the housing. The closed-ended bellows membrane structure may be substantially free-floating within the housing. Alternatively, the closed-ended bellows membrane structure is operably affixed to a surface of the housing. Preferably, the at least one non-gaseous support medium comprises a compressible, substantially self-supporting material. A cavity may be disposed in the support medium. In an alternative embodiment, the at least one non-gaseous support medium comprises an incompressible, flowable, substantially self-supporting constant volume material. A cavity may be disposed in the incompressible, flowable, substantially self-supporting constant volume material. The at least one non-gaseous support medium may further comprise one of the following materials: a liquid, a slurry.

According to one embodiment of the invention, the at least one non-gaseous support medium is positioned substantially on the inside of the SNF membrane, and the outside of the SNF membrane is exposed to the system fluent material. According to an alternative embodiment of the invention, the at least one non-gaseous support medium is positioned substantially on the outside of the SNF membrane, between the SNF membrane and the inner surface of the housing or ambient, and the inside of the SNF is exposed to the system fluent material.

The housing of the accumulator/compensator apparatus, or the accumulator/compensator apparatus itself, may be operably configured (in its structure and/or material composition) to limit the magnitude of dimensional changes made by the SNF membrane in response to pressure fluctuations of the system fluent material or to induce a preload into the accumulator/compensator, or to provide a nonlinear response to system pressure fluctuations.

For those embodiments which incorporate a cavity, a flow control structure may be operably associated with the cavity, for regulating flow of gas into and out of the cavity, providing additional hysteresis for damping.

In another embodiment of the invention, the substantially non-permeable, flexible membrane and the non-gaseous support medium are cooperatively configured (in their structure and/or material selection) to produce a predetermined rate and/or amount of deflection of the membrane in response to a predetermined rate and/or value of pressure differential from a predetermined pressure encountered across the accumulator/compensator.

In a further alternative embodiment of the invention, a discrete dedicated housing, as such, for the accumulator/compensator may be omitted, or may be provided as a partial housing.

BRIEF DESCRIPTION OF THE DRAWINGS

FIG. 1 is a schematic illustration of a prior art bladder or diaphragm-type accumulator/compensator.

FIG. 2 is a schematic illustration of a prior art bellows-type accumulator/compensator.

FIG. 3a is an illustration of a manner of fabricating the bellows for a prior art bellows-type accumulator/compensator.

FIG. 3b is an illustration of a prior art unreinforced bellows.

FIG. 3c is an illustration of a prior art reinforced bellows.

FIG. 4 is a schematic illustration of an accumulator according to one embodiment of the present invention, in the environment of a pressurized fluent material system.

FIG. 5 is an illustration of an open-ended accumulator according to an embodiment of the present invention, employing a compressible support medium.

FIG. 6 is an illustration of another open-ended accumulator, according to another embodiment of the present invention, employing a compressible support medium.

FIG. 7 is an illustration of another open-ended accumulator, according to another embodiment of the present invention, employing a compressible support medium.

FIG. 13 is an illustration of an open-ended accumulator, according to another embodiment of the present invention, employing an incompressible, constant volume material, support medium.

FIG. 14 is an illustration of an open-ended accumulator, according to another embodiment of the present invention, employing an incompressible, constant volume material, support medium with an internal cavity.

FIG. 15 is an illustration of a closed-ended, accumulator, with a free-floating SNF membrane, according to another embodiment of the present invention, employing an incompressible, constant volume material, support medium with an internal cavity.

FIG. 16 is an illustration of a closed-ended accumulator, with a fixed SNF membrane, according to another embodiment of the present invention, employing an incompressible, constant volume material, support medium with an internal cavity.

FIG. 17 is an illustration of a closed-ended accumulator, with a free-floating SNF membrane, employing an incompressible medium, together with an internal cavity and a liquid or slurry.

FIG. 18 is an illustration of a closed-ended accumulator, with a fixed SNF membrane, employing an incompressible medium, together with an internal cavity and a liquid or slurry.

FIG. 19 is an illustration of a closed-ended accumulator, with a fixed SNF membrane, employing an incompressible medium, with an internal cavity and a throttle and orifice in the cavity for controlling flow of gases in the cavity.

FIG. 33 is a schematic sectional illustration of an accumulator according to the present invention, in which the membrane is in the form of a diaphragm.

FIG. 34 is a schematic sectional illustration of an accumulator according to the present invention, in which the membrane is in the form of an expandable elongated tube, in its relaxed state.

FIG. 35 is a schematic sectional illustration of the accumulator according to the embodiment of FIG. 34, in which the accumulator is in a loaded state.

FIG. 36 is a schematic sectional illustration of an accumulator according to the present invention, in which the membrane is in the form of a deformable elongated tube, wherein the cross-section of the tube in its relaxed state is elliptical.

FIG. 37 is a schematic sectional illustration of the accumulator according to the embodiment of FIG. 36, with the accumulator in a loaded state.

BEST MODE FOR CARRYING-OUT THE INVENTION

Figure 8:
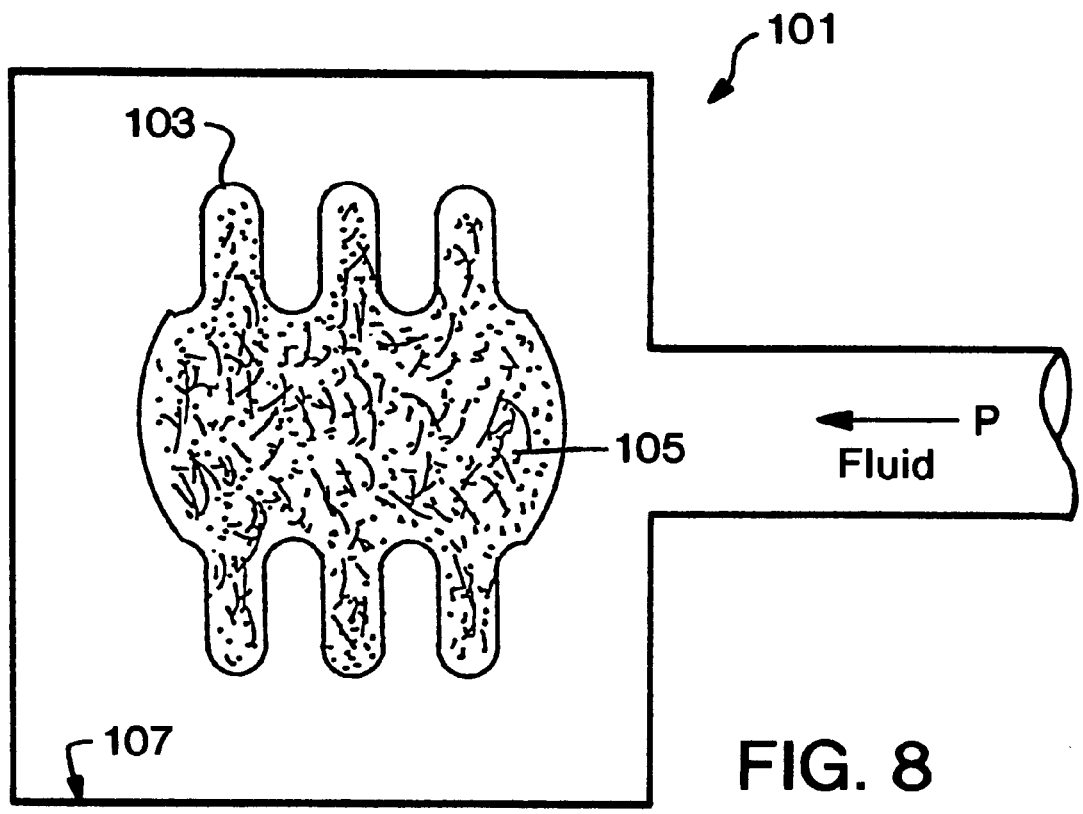
FIG. 8 is an illustration of a closed-ended accumulator according to an embodiment of the present invention, employing a compressible support medium.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

FIG. 4 illustrates schematically a representative environment for the accumulator/compensator apparatus of the present invention. Pressurized fluent material system 60 includes fluid pump 62, fluid transmission line 64, accumulator 66, and the functional system 68, which may be, for example, a power steering unit or braking unit for an automobile. The accumulator/compensator apparatus of the present invention may also be employed in other pressurized fluent material systems, involving pressurized liquids, gases or slurries, and may be suitably adapted to specific applications by one of ordinary skill in the art having the present disclosure before them, without departing from the scope of the present invention.

The accumulator 66 includes housing 70, metal bellows membrane 72 and support medium 74. While housing 70 is represented schematically by a simple box, it is understood that the shape, configuration and material of housing 70 will be modified to suit the space and performance requirements of the particular pressurized system and environment from application to application. Alternatively, the "housing" may simply be a region, already existing in the fluent material system, at which location an accumulator/compensator may be advantageously positioned, or plugged in, such as a system fluent material reservoir, or even a location in a straight run of the fluent material line.

In the embodiment of FIG. 4, the support medium, which fills the entire interior space of the membrane 72, is a compressible medium, such as a dense foamed polymer material, such as polyurethane. The end of the bellows membrane is closed, for example, by a plug 76.

The combination of bellows membrane, support medium and plug may be configured so that if the static gauge pressure of the fluent material is at zero (i.e., at ambient pressure), then the compressible support medium is at its neutral uncompressed and unexpanded condition, and the bellows membrane is at its fullest operable extension. Such a configuration is suitable for systems in which the pressure range starts at zero gauge pressure up to some maximum operating pressure. Some pressurized fluent material systems, however, even when not operating, may have substantial non-zero gauge pressures, and the operating pressures may be substantially greater than the lowest, non-operating pressure. Accordingly, the accumulator may be preloaded, in that the bellows membrane and/or the support medium will always be under internal compression, or load, so as to be able to resist compression at a non-linear or offset spring rate.

The apparatus of the present invention acts as a compensator, in that when over-pressures are encountered in a pressurized fluent material system, the device incorporates a compressible structure which will yield, to absorb the excess pressure and fluent material volume, so as to prevent a blow-out failure or other over-stressing of other structures in the pressurized fluent material system.

The apparatus of the present system can also act as an accumulator, in that the support medium or media within the bellows membrane is/are both elastic and resilient, preferably with a relatively high spring rate, so that the combined bellows membrane/support medium structure is capable of pushing back against the system fluent material. Some fluent material systems, like fuel injection systems which incorporate pumps, etc., when not operating still have a substantial gauge pressure, but upon start up, suffer an initial substantial pressure drop as the pump spins up to operating speed. These systems have some inertia on start up and require a boost to return to full operation. In such environments, the device of the present invention can act as a reservoir of pressure force which is released upon start up of the system, to prevent the sudden initial pressure drop which may be characteristic of such systems. Thus, the apparatus of the present invention acts as an energy accumulator.

In the accumulators of the present invention, the substantially non-permeable, permeable, flexible membranes (SNF's) may be formed as continuous bellows structures, which may be formed, for example, by hydroforming, by elastomeric forming, by spinning or by other methods. The present invention may even be used with welded diaphragm-type bellows, though, of course, the cost of manufacturing such bellows would likely be prohibitive.

In addition to bellows, other membrane structures may be used, such as metal balloons, metal diaphragms or even substantially cylindrical metal tubes, a key characteristic being that the membrane structure be able to change its working volume through repeated cycles and that the membrane structure protect the support medium from potentially harmful (to the support medium) pressurized fluent materials.

Such non-bellows configurations are shown in FIGS. 33–37. FIG. 33, for example, illustrates an accumulator 800, in which the membrane is in the form of an initially flat diaphragm 805, which divides the interior space of the housing 810 into two segregated regions, an open region exposed to the system fluent material, and a region segregated from the system fluent material, which may be completely occupied by the support medium 815. The relaxed state of the diaphragm is shown in solid lines, while the loaded state may be shown by the broken lines.

FIGS. 34, 35 illustrate one form of cylindrical tube membrane type accumulator 900. In the embodiment of FIGS. 34–35, the membrane 905 may be a form of cylindrical tube or balloon, surrounded by support medium 910, which, in turn, may or may not be surrounded by a separate housing structure. For example, if the support medium is compressible, a housing may be desired. If an incompressible, constant-volume material is used for the support medium, then either the housing must likewise be expandable, or no housing is used. A housing may be omitted entirely, if the support medium is relatively robust and self-supporting. The cross-section of the membrane 905 may be rectangular, triangular, circular, elliptical, etc. FIG. 34 shows the accumulator in a relaxed position, and FIG. 35 shows the accumulator in a loaded configuration.

FIGS. 36 and 37 illustrate a variation 900" of the embodiment of FIGS. 34 and 35, in which membrane 905" is a tubular membrane, having a cross-section which is elliptical, when the accumulator is in its relaxed configuration. Membrane 905" is surrounded by support medium 910". As in the embodiment of FIGS. 34–35, depending upon the constitution of support medium 910", a housing may or may not be necessary or desired. As the system fluent material pressure rises, the pressure will tend to force the membrane into a circular configuration, as shown in FIG. 37.

Non-metallic materials (e.g., resilient plastics, etc.) may also be used as the membrane material, if they are chemically and physically suitable and desirable, for the particular application.

An advantage of the present invention is the ability to employ such continuous membrane structures, in preference to welded membrane structures like the welded bellows of FIG. 3a, which are built up from a series of contoured diaphragms, as described hereinabove. In continuous bellows structures, for example, a minimum number of welds are required, and any welds that are used are usually confined to the ends of the bellows, and are usually not located in the convolutions, where the greatest stresses are felt during compression or extension of the bellows. The present invention, which employs a support medium, other than pressurized gas or in addition to a pressurized gas, in the interior of the bellows, allows the use of a much thinner bellows structure, so that the bellows itself acts more like a membrane between two regions with the support medium carrying the load from the pressurized fluent material, that a bellows by itself may not be able to withstand. Prior art bellows structures instead acted as shells, in which a substantial portion of the load from the system fluent material was borne by the bellows itself.

The following concepts, in terms of physical characteristics of accumulator structures, and in particular, the bellows/membrane components, are believed to be applicable to the technical field of the present invention, and may be useful, in helping one to appreciate the operation and design considerations involved:

$\sigma_S$ (system stress)—the stress(es) seen by the accumulator as a result of system pressure;

$\sigma_{FM}$ (membrane failure stress)—the allowable failure stress of the bellows (membrane);

$\sigma_{STRAIN}$ (strain induced stress)—stress induced on the bellows (membrane) as a result of required membrane volume compensation caused by system fluent material pressure changes;

$\sigma_{FS}$ (support media failure stress)—allowable failure stress of the support media;

$\sigma_{SS}$ (strain induced support stress)—stress induced on the support media as a result of required support media volume compensation caused by system fluent material pressure changes.

For accumulator designs in which a membrane is not supported, it is understood that $\sigma_{FM}$ must be greater than $\sigma_S$. As system pressure rises, membrane material thickness must increase to limit $\sigma_S$. Additionally, $\sigma_{FM}$ must be greater than $\sigma_{STRAIN}$. For a given structure and required deflection, as membrane thickness rises, $\sigma_{STRAIN}$ also rises. The result of these rising values is that for higher pressure systems, the membrane thickness must be increased to limit $\sigma_S$; however, at such thickness, $\sigma_{STRAIN}$ is greater than $\sigma_{FM}$.

For accumulator constructions of the present invention, the failure stress of the membrane/support media combination must be greater than $\sigma_S$. Additionally, $\sigma_{FM}$ must be greater than $\sigma_{STRAIN}$ AND $\sigma_{FS}$ must be greater than $\sigma_{SS}$. As system pressures increase, support media materials and/or geometries can be changed to limit $\sigma_S$. The membrane thickness can then be kept lower (lower than unsupported bellows) so that $\sigma_{FM} > \sigma_{STRAIN}$, and if materials are chosen in accordance with the desired characteristics discussed herein, $\sigma_{FS} > \sigma_{SS}$.

As an example, consider a high pressure accumulator/compensator bellows application. In order to handle the high steady state pressures the wall thickness of the bellows must be increased. As the wall thickness is increased, the stress induced onto the bellows through bending caused by pressure fluctuations is also increased. This can then lead to early fatigue of the bellows.

If, instead of thickening the wall of the bellows, a support, such as a rubber material, is placed in the bellows, the system steady state pressure can be withstood by the support combined with the bellows. Because the bellows is thinner than before (than with unsupported bellows), the stress induced onto the bellows through bending caused by pressure fluctuations is not as severe and the life of the bellows increases. The support by its nature can also easily endure the stress induced onto itself through bending caused by pressure fluctuations.

Some previous accumulator/compensator constructions used compressed gases to support a membrane. However, such constructions are by nature expensive to construct. They must have a container that is pressurized and then somehow sealed. This leads to complicated construction techniques, or limited designs. Conversely, accumulators of the present invention will not necessarily be affected by exposure to ambient conditions, because the support media are not necessarily compressed prior to placement in the fluent material system.

Figure 26:
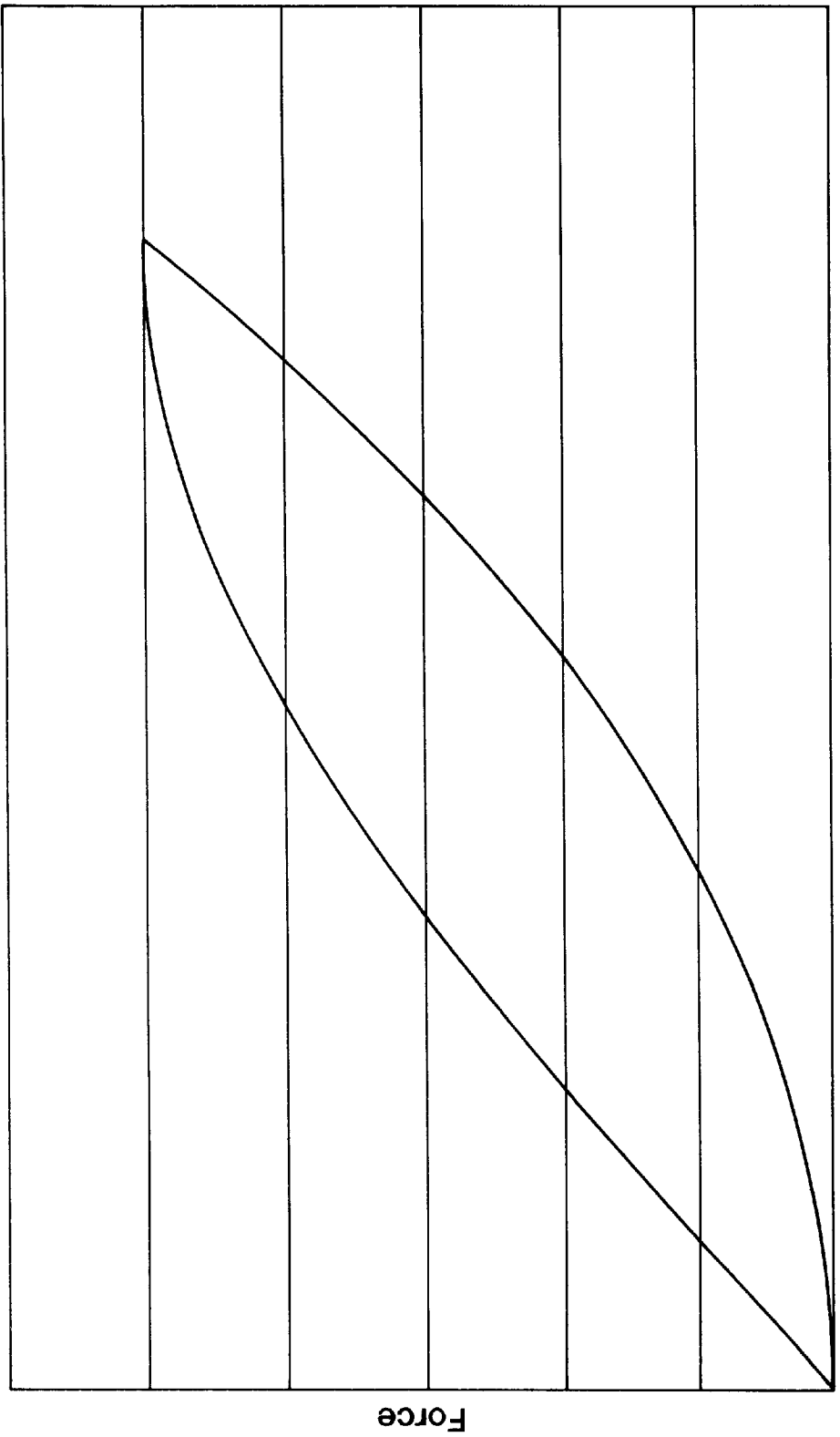
FIG. 26 is an illustration of a representative hysteresis plot for an accumulator.
Figure 27:
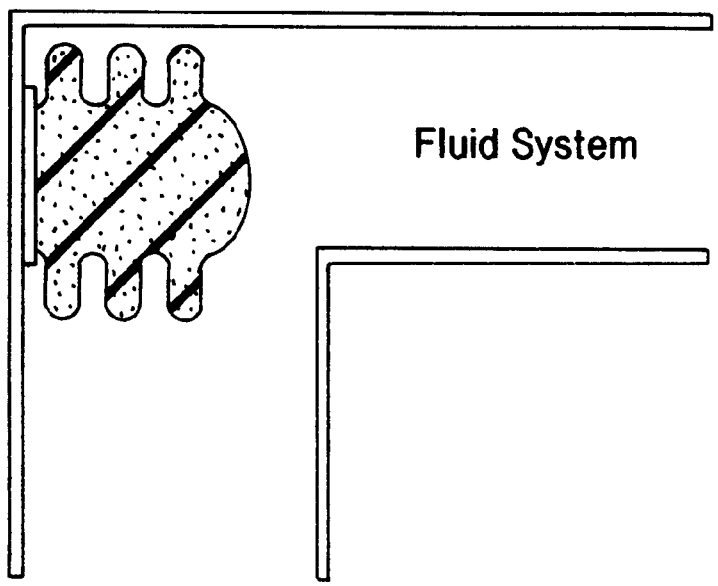
FIG. 27 is an illustration of an example of how an accumulator of the present invention may be incorporated into an existing fluent material system, without a separate dedicated housing.

A useful concept to keep in mind when considering accumulator structures is a hysteresis plot. In such a plot, on the vertical ("y") axis, will be plotted the pressure differential ("FORCE") across the membrane or support media. The horizontal ("x") axis represents the amount of compression the membrane undergoes ("DEFLECTION") as a result of the force. Such a plot is illustrated in FIG. 26, the deflection of the apparatus, as force is being applied (upward arc) is not the same as the deflection of the apparatus as the force is taken off. This behavior is either time related or mechanically induced. FIG. 26 also illustrates an apparatus that has a nonlinear response; i.e., the slope of the force/deflection curve is not a constant. A device having a linear response would have a plot which is a straight line. The apparatus reflected in the plot is not preloaded, in that the plot has a substantially non-infinite spring rate over its working interval. An apparatus which is preloaded (i.e., undercompression, even in an inactive state), would have a plot described as having a constant value of deflection over a certain force range somewhere within the entire operating regime of the accumulator. Once the force is out of this regime, it will become one-to-one with respect to deflection. By definition, a preloaded accumulator is nonlinear.

Several embodiments are contemplated for the accumulator/compensator apparatus of the present invention. For simplicity of illustration, each contemplated embodiment will be illustrated schematically, and the remainder of the pressurized systems to which such accumulator/compensator apparatus may be connected, will be omitted.

For example, the bellows membrane may be mounted in the housing in such a way that one end of the bellows is open to ambient. FIGS. 5–7 illustrate variations of this configuration.

In FIG. 5, accumulator 80 is formed by bellows membrane 82, having open end 84, in housing 86. Support medium 88 is, in this case, again a compressible, self-supporting medium, such as a dense closed-cell polymeric material. The open end 84 of bellows membrane 82 is aligned with and coextensive with an opening in the housing 86, and may be affixed to the housing by a weld 90. Any other suitable attachment method may be used, so long as the connection between the bellows membrane and the housing is effectively sealed against the escape of the system fluent material, especially into the ambient environment or into the interior of the bellows membrane and into contact with the support medium.

Upon an occurrence of a pressure spike, the bellows will compress, in turn compressing the compressible medium. Because of the open end of the bellows, a portion of the compressible, self-supporting medium may be transiently extruded out of the opening (as indicated by the broken line), but will be drawn back into the interior of the bellows membrane, upon release of the over-pressure.

FIG. 6 illustrates a similar construction for an accumulator having an open-ended bellows membrane, wherein similar structures are provided with similar reference numerals, augmented by a prime ('). The accumulator 80' of FIG. 6 differs from the structure of FIG. 5 in that a portion of the open end 84' of bellows membrane 82' flares out to extend beyond the edges of the opening in the housing to provide a greater area for attachment and sealing of the end of the bellows membrane 82' to the interior of the housing 86'.

FIG. 7 illustrates a similar construction for an accumulator having an open-ended bellows membrane, wherein similar structures are provided with similar reference numerals, augmented by a double prime ("). The accumulator 80" of FIG. 7 differs from the structure of FIG. 5 in that a portion of the open end 84" of bellows membrane 82" flares out to extend beyond the edges of the opening in the housing to provide a greater area for attachment and sealing of the end of the bellows membrane 82" to the interior of the housing 86", and a sealing gasket or other separate sealing member 92", such as are known in the art of pressurized fluent material systems, is positioned between the end 84" of bellows membrane 82" and the wall of housing 86".

Other methods may be used for attaching an open-ended bellows membrane to the housing, such as by extending the open end of the bellows membrane out of the opening of the housing and then affixing the end to the housing, etc., without departing from the scope of the present invention, so long as the end result is a secure attachment of the bellows membrane to the housing which precludes escape of the system fluent material or exposure of the support medium to the system fluent material.

Such open-ended bellows membrane accumulators may be best suited for lower pressure systems. However, when the operating pressure ranges are higher, and particularly when the pressure spikes are significantly higher, either absolutely or in comparison to the operating pressure ranges, then it may become necessary to provide a closed-end bellows membrane.

One way to provide a closed-end bellows membrane accumulator is to provide a completely enclosed bellows membrane structure, as illustrated in FIGS. 8–11.

A simplest form of closed-end bellows membrane accumulator 101 is illustrated in FIG. 8. Completely continuous bellows membrane 103 is filled with a compressible support medium 105, such as previously described, and is located in the interior of housing 107, but is not affixed to any particular position within housing 107. Accordingly, once housing 107 is filled with system fluent material, bellows membrane 103 will then be free to move about the interior of housing 107. When a pressure differential is encountered, the bellows membrane 103 will compress axially, and then return upon release of the over-pressure.

If it is undesirable for the bellows membrane to be free-floating in the interior of the housing, then the bellows membrane may be affixed to a desired location within the housing, by any suitable means 109' such as weld, braze, tie-down, etc.

Figure 9:
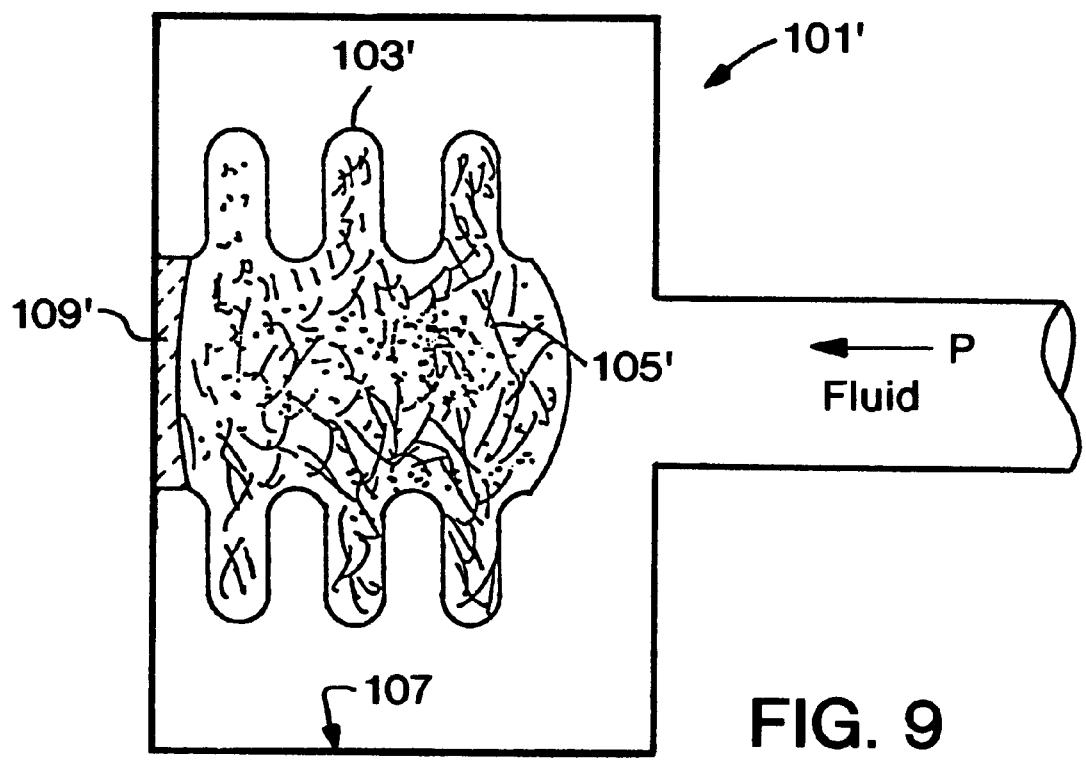
FIG. 9 is an illustration of another closed-ended accumulator, according to another embodiment of the present invention, employing a compressible support medium.

Such a construction is illustrated in FIG. 9, wherein structures similar to those of FIG. 8 are provided with similar reference numerals, augmented by a prime (').

The manner of effecting the closure of the end of the bellows membrane may be accomplished in a variety of ways. For example, the end of the bellows may be closed by welding a cover or plug directly to the end of the bellows membrane, after filling with the support medium, and prior to affixation of the bellows membrane to the interior of the housing. Alternatively, the open end of the bellows membrane may be affixed to a solid, imperforate interior wall of the housing. As a further alternative, the open end of the bellows membrane may be affixed to an interior (or wrapped around to an exterior) wall of the housing, aligned with and/or passing through an aperture in the housing wall. Thereafter, a cover or plug may be affixed to one or both of the open end of the bellows membrane or the housing wall, to effect a sealed closure of the bellows membrane end. Other methods may be used without departing from the scope of the present invention so long as the end result is the secure attachment of the accumulator to the housing and that the bellows is closed and sealed.

As an alternative to the use of a compressible support medium, a flowable, but incompressible (constant volume material) material, such as rubber or urethane or the like, may be used as the support medium, so long as space is provided for the displaced support medium. Such structures are demonstrated in FIGS. 10–11. Note that the internal cavity/cavities may or may not be surrounded by the support medium.

Figure 10:
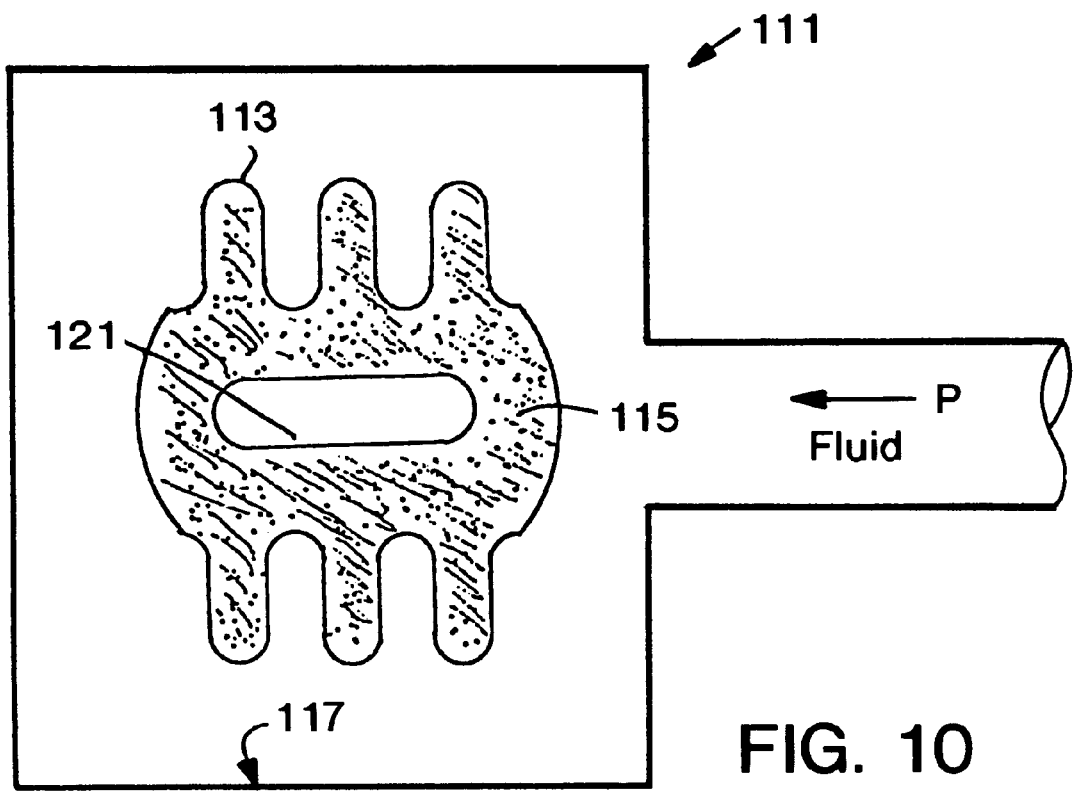
FIG. 10 is an illustration of a closed-ended accumulator, with a free-floating SNF membrane, employing an incompressible support medium with an internal cavity.

In the embodiment of FIG. 10, like the embodiment of FIG. 8, bellows membrane 113 of accumulator 111 is completely continuous and free-floating. Completely continuous bellows membrane 113 is substantially filled with an incompressible (constant volume material) support medium 115, such as previously described, and is located in the interior of housing 117, but is not affixed to any particular position within housing 117. An internal cavity 121 is positioned, preferably substantially centrally within support medium 115. Once housing 117 is filled with system fluent material, bellows membrane 103 will then be free to move about the interior of housing 117. When a pressure differential is encountered, the bellows membrane 113 will compress axially, and then return upon release of the overpressure. During such compression, the gas in the internal cavity, which may be air or any other suitable gas, will become compressed, enabling the flowable, incompressible (constant volume material) support medium to flow into the area formerly occupied by the cavity. It can be seen that once the gas in the cavity has been so reduced that opposite sides of the cavity begin to touch, that there is a limit to the amount of compression which the bellows membrane can undergo.

Again, if it is undesirable for the bellows membrane to be free-floating in the interior of the housing, then the bellows membrane may be affixed to a desired location within the housing, by any suitable means 119' such as weld, braze, etc. Such a construction is illustrated in FIG. 11, wherein structures similar to those of FIG. 10 are provided with similar reference numerals, augmented by a prime (').

Preferably, when the interior cavity 121, 121' is formed in support medium 115, 115', it will be formed as an elongated space with rounded ends. As a practical matter, if squared ends were to be used for the internal cavity, there would be portions of the cavity, in the corners, to which the flowable, incompressible (constant volume material) support medium would never flow, and accordingly, such portions of the internal cavity would be wasted space. Note that the internal cavity/cavities may or may not be surrounded by the support medium.

Figure 11:
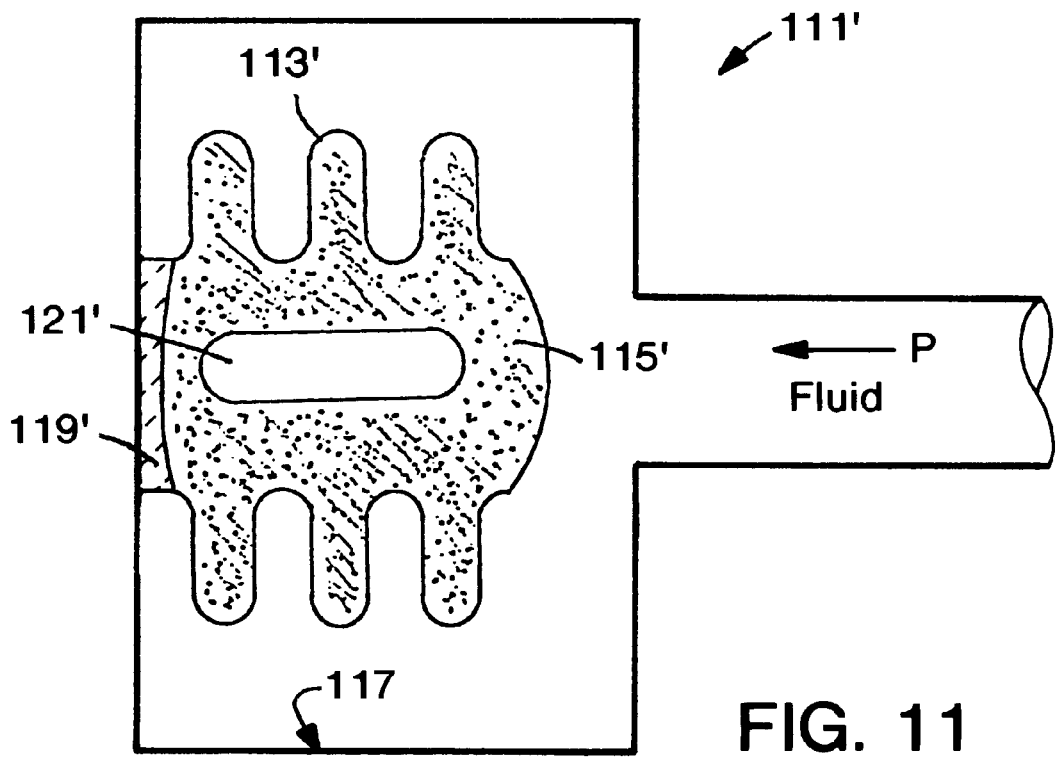
FIG. 11 is an illustration of a closed-ended accumulator, with a fixed SNF membrane, employing an incompressible support medium with an internal cavity.

The gas in the internal cavity in the embodiments of FIGS. 10–11 may be pre-pressurized to provide a preload, if desired, depending upon the operating pressure regimes which will be encountered in any particular application of the apparatus.

For those embodiments of the invention, in which the accumulator is under an internal preload (e.g., in an application having a substantial non-zero steady state gauge pressure), it may be desirable to limit the amount of potential expansion which the SNF membrane can undergo, in order to prevent, for example, permanent deformation of the SNF membrane, or to enhance the useful lifespan of the part by preventing fatigue which might be encountered by repeated overextension cycling of the SNF membrane. Such potential overextensions might be encountered in applications where the pressure spikes occur often and are substantially greater in magnitude than the normal operating pressure regime. Overextensions might also be encountered when the operating pressure regime is relatively high and there is zero gauge pressure when the system is off, or if there is a "blow-out" or other failure in the system, and the pressure drops suddenly.

Figure 12:
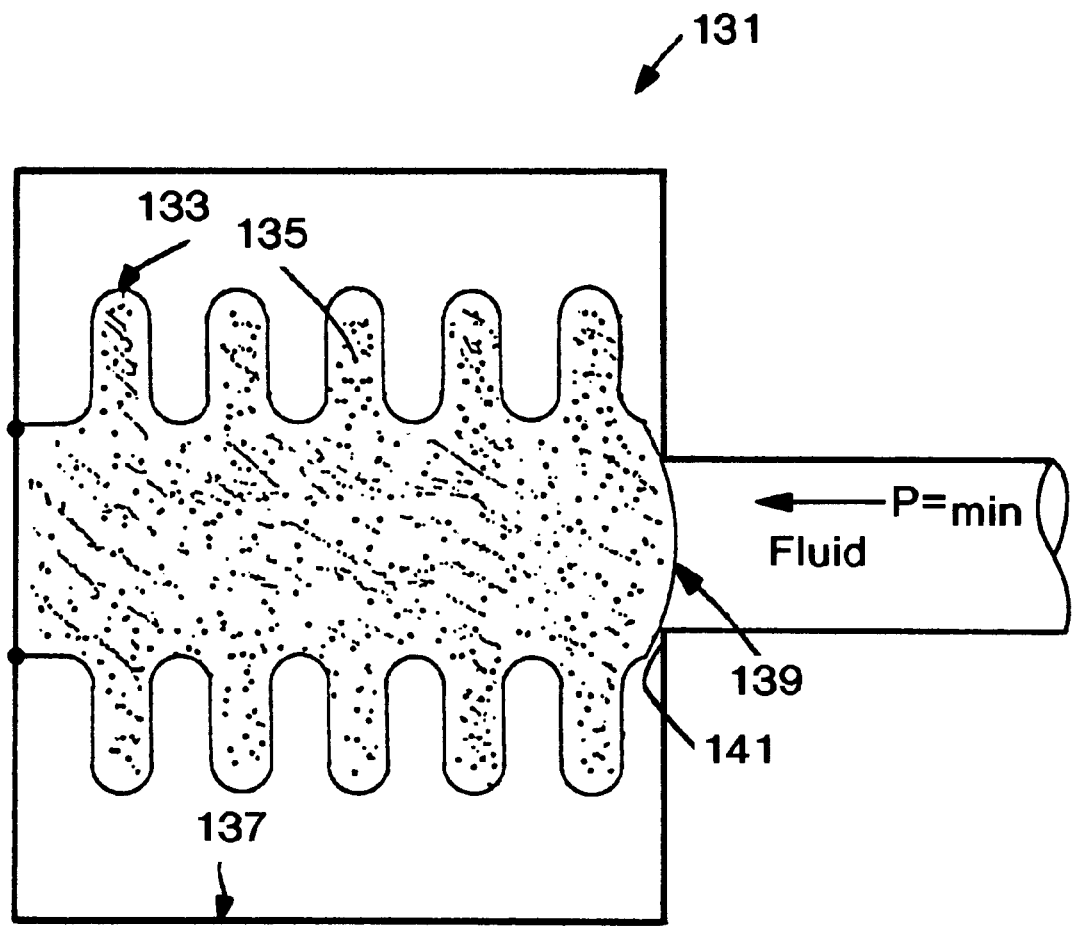
FIG. 12 is an illustration of another closed-ended accumulator, according to another embodiment of the present invention, employing a compressible support medium, and featuring a stop function to preclude overextension.

To prevent such overextension, a stop structure may be provided. A simple stop structure is represented in FIG. 12. Housing 137 of accumulator 131 will preferably be sized so that when a predetermined minimum fluent material pressure is encountered, bellows membrane 133 will be expanded by compressible medium 135 to such an extent that an end (or other) surface 139 of bellows membrane 133 will physically abut a corresponding surface or surfaces 141 on the interior of housing 137. Thus, if the pressure of the fluent material were to continue to drop, bellows membrane 133 would be prevented from overextension under the force of compressible support medium 135 and would be protected from damage. Other structures may be provided on the interior of housing 137, as may be desired, to provide such a stopping action, if it is not desired to use the actual interior surface of the housing as the stop. Further, the surface 141 need not be positioned proximate the opening connecting the housing to the line, as shown in FIG. 12, but may be positioned as the requirements of the particular application dictate. Additional stops may be provided in the interior of the bellows. It is to be understood that while the apparatus of FIG. 12, incorporating a stop function, is shown and described using a compressible support medium, other support media may be employed, such as the combination of an incompressible (constant volume material), flowable support medium together with an internal cavity, or with liquid or slurry.

Several other variations of the apparatus, employing an incompressible (constant volume material), flowable, support medium, are contemplated as being within the scope of the present invention. For example, in FIG. 13, accumulator 151 may have an open-ended bellows membrane 153, aligned with an opening 155 in housing 157. Bellows membrane 153 may be completely filled with a self-supporting, flowable, incompressible (constant volume material) support medium, such as described hereinabove. Bellows membrane 153 may be affixed to the interior of housing 157 by any suitable method as discussed herein. Upon encountering an over-pressure, a portion of the flowable, incompressible (constant volume material) support medium may be transiently extruded out of the end of the bellows membrane (as shown by the broken line), to be drawn back in, upon relief from the over-pressure.

FIG. 14 illustrates a configuration similar to that of FIG. 13, except that an internal cavity 161' is provided in support medium 159'. As the bellows membrane is compressed during over-pressure, the walls of the internal cavity will move toward one another, as illustrated by the broken line. Structures similar to those of FIG. 13 are provided with similar reference numerals, augmented by a prime (').

FIGS. 15 and 16 illustrate accumulator embodiments, in which the bellows membrane has a closed end. In FIG. 15, accumulator 171 has a free-floating continuous bellows membrane 173, in housing 175. Flowable, incompressible (constant volume material) support medium 177 is provided with an internal cavity 179 which may be filled with air or some other suitable gas, which may or may not be pre-pressurized. In FIG. 16, accumulator 181 has closed-end continuous bellows membrane 183, which is attached, by any suitable means, to housing 185. Incompressible (constant volume material) support medium 187 is likewise provided with an internal cavity 189 which may be filled with air or some other suitable gas, which may or may not be pre-pressurized. Compressible materials may be used as well as liquids or slurries.

FIGS. 17–18 illustrate further embodiments of the invention, in which a combination of different structures make up the support media in the interior of the bellows membrane. In FIG. 17, for example, accumulator 201 includes a free-floating closed-end continuous bellows membrane 203, in housing 205. Inside bellows membrane 203 is a flowable, incompressible (constant volume material) support medium 207, which may be, for example, solid rubber or neoprene, or the like. A liquid or slurry material 209 surrounds support medium 207. Liquid or slurry material 209 may be any suitable material, which will support the membrane, and have a viscosity which will enable the accumulator to respond to pressure fluctuations. For example, a low viscosity will enable a rapid response to fluctuations, which may be suitable for high frequency or high volume fluctuations, in which volume compensation is critical. A high viscosity material may be suitable for applications in which dampening of pressure oscillations is more important than volume compensation. A possible liquid which may be used is glycerine. A slurry material may be provided by the use of small spheres (e.g., of plastic) suspended in a liquid of suitable characteristics. During expansion or compression of the bellows membrane, the incompressible (constant volume material) support medium 207 might pull away from the inner surfaces of the convolutions or might otherwise bind or create friction which might impede the proper operation of the accumulator. A slurry or liquid, while still providing resistance to pressure and support for the bellows membrane, will be more likely to "fill" the outer reaches of the bellows convolutions, while at the same time reducing friction effects.

In FIG. 18, the bellows membrane 223 of accumulator 221 is affixed to an interior surface of housing 225 by a weld 233 or other suitable attachment method. Accumulator 221 is likewise provided with a flowable, incompressible (constant volume material) support medium 227, surrounded by a liquid or slurry 229, all surrounding internal cavity 231. It can readily be seen that in alternative constructions, bellows membrane 223 may be continuous and closed-ended, prior to affixation to housing 225, or it may be open-ended, and directly affixed to the housing, or connected to or through an aperture in the housing and plugged, in accordance with the various methods previously discussed.

To further assist the accumulator in its function of absorbing and damping pressure fluctuations, in the embodiment(s) having a support medium in combination with an internal cavity, further damping (yielding resistance to compression) can be obtained by extracting energy from the process of collapsing the internal cavity. For example, FIG. 19 illustrates an accumulator 241 having a closed-ended bellows membrane 243, filled with a flowable, incompressible (constant volume material) medium 245, in housing 247. An internal cavity 249 is provided, which is substantially divided into two separate, but connected regions by a throttle structure 251 having an orifice 253. As illustrated, the bellows membrane 243 is the open-ended type, which has been attached directly to an inside wall of the housing 247, although other constructions may be employed, as described hereinabove. In operation, as bellows membrane 243 is compressed, the cavity will collapse, from the right end. The gas in the cavity will be compressed, and simultaneously driven from the right side of the cavity, through the orifice, and into the left side of the cavity, providing rate sensitive resistance to compression. The reverse process will occur upon unloading of the over-pressure. In an alternative embodiment of the invention, the left end of the left side of the cavity may be exposed to ambient, although that will reduce the return force exerted by the accumulator. Compressible materials and liquids and slurries may also be used.

Figure 20:
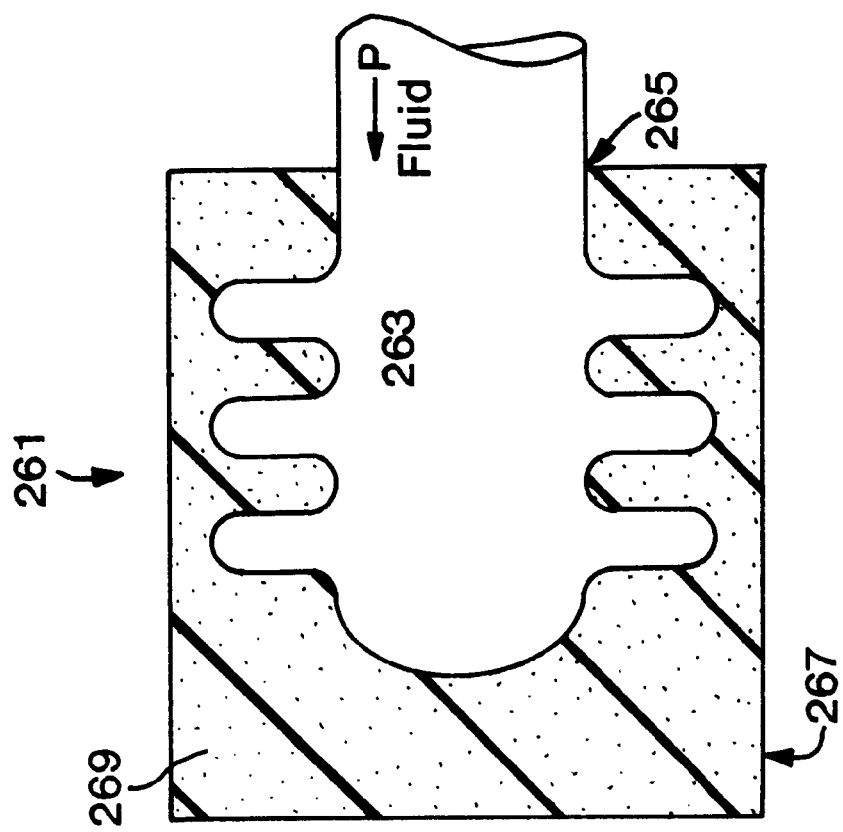
FIG. 20 is an illustration of a closed-ended accumulator having a reversed construction, with the SNF membrane surrounded by a compressible support medium, in a housing.
Figure 21:
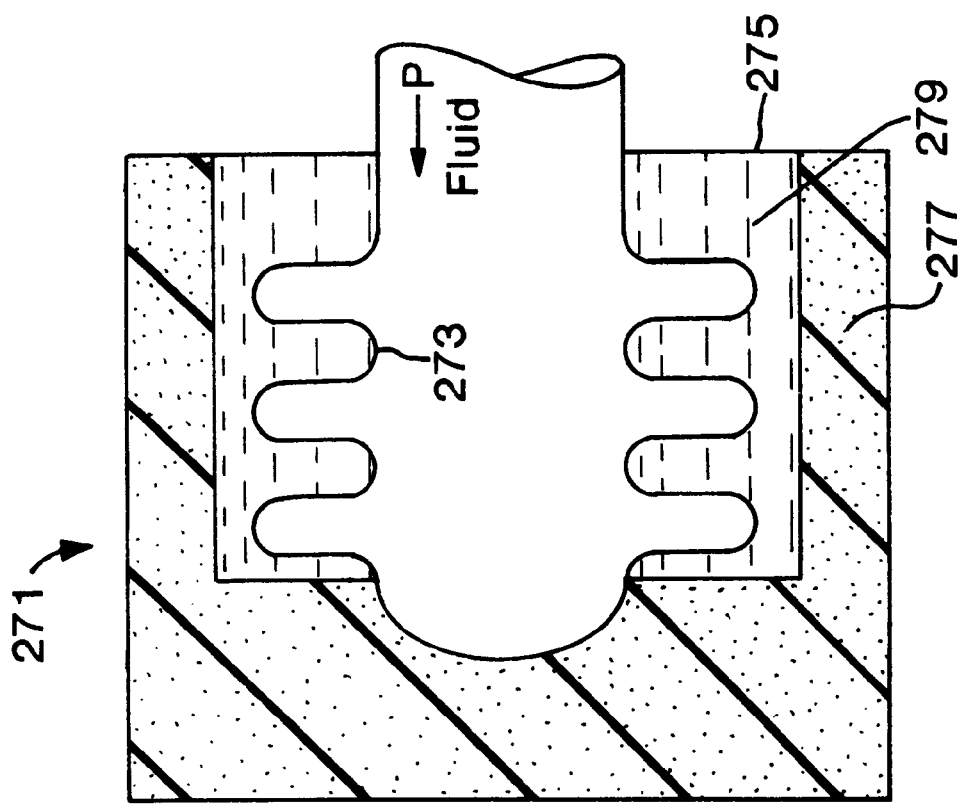
FIG. 21 is an illustration of a closed-ended accumulator having a reversed construction, with the SNF membrane surrounded by a compressible support medium and a liquid or slurry, in a housing.

FIGS. 20–21 illustrate further variations of the present invention. In these embodiments, the support material is in contact with the outside of the bellows membrane, instead of on the inside, as in the previously discussed embodiments.

In FIG. 20, accumulator 261 comprises bellows membrane 263, in housing 267. A portion of bellows membrane 263 passes through aperture 265 of housing 267, and is sealingly affixed thereto, using one of various attachment methods previously discussed. Compressible support medium 269 fills the entire interior of housing 267 which is not occupied by bellows membrane 263, which is suitable attached to a pressurized fluent material line (not shown), using conventional attachment techniques. Upon the occurrence of an over-pressure, bellows membrane 263 will tend to expand, pushing against and compressing the support medium 269.

In the embodiment of FIG. 21, accumulator 271 incorporates liquid or slurry material. Bellows membrane 273 is positioned within and sealingly affixed to a wall of housing 275. Compressible support medium 277 substantially fills the interior volume of the housing 275, except for a region of liquid or slurry 279, which immediately surrounds the convolutions of bellows membrane 273. Upon encountering an over-pressure, the bellows membrane 273 will tend to expand toward the left, referring to the illustration. The flowable, constant volume liquid or slurry will flow around the expanding bellows membrane 263, while the bellows membrane and the liquid or slurry will, in turn, compress the compressible support medium, until the over-pressure abates.

Instead of using a compressible medium with or without the use of liquid or slurry, other combinations of support media may be employed, such as a combination of incompressible rubber or urethane, with an internal cavity or with a opening to ambient in the housing, or with no housing at all (typically for relatively low pressure systems) or others of the combinations which have been discussed with respect to the other embodiments of the accumulator of the present invention.

FIGS. 22–25 illustrate embodiments of the invention, in which the accumulator/compensator may be preloaded, so that the plot of deflection of the membrane versus the pressure of the system has a substantially infinite spring rate over part of the pressure regime.

Figure 22:
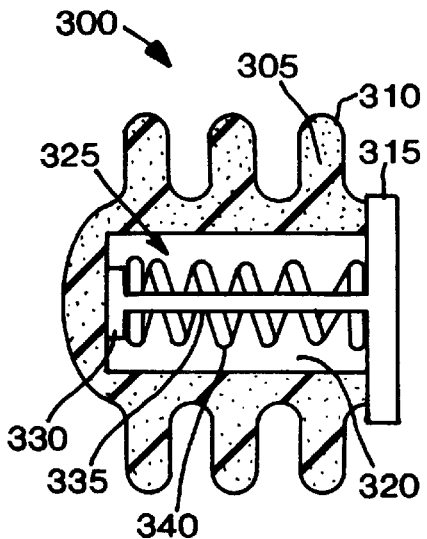
FIG. 22 is a schematic illustration, in section, of a preloaded accumulator according to an embodiment of the present invention.

Accumulator 300 is shown in FIG. 22. The housing has been omitted from the illustration, but it is to be understood that accumulator 300 may be connected to a pressurized fluent material system in the same manner as that of other accumulators, in which the system fluent material contacts the outside surface of the SNF membrane. Accumulator 300 is a closed-end accumulator. That is, the interior space of the SNF membrane is completely segregated from the surrounding environment.

A support medium 305, which may be a compressible material or a flowable, constant-volume material, is provided in membrane 310 of accumulator 300. The open end of membrane 310 is closed by a plug 315. In an interior cavity 320 of support medium 305 is provided a preload mechanism 325. Preload mechanism 325 includes support member 330, limit member 335 and biasing member 340, which in the embodiment of FIG. 22, may be a coil spring. Preload mechanism 325 is shown in its steady state, preloaded configuration, in FIG. 22. Limit member 335 will be operably connected to plug 315 and to support member 330 in such a manner that, as illustrated, support member 330 and limit member 335 are movable, relative to plug 315. Support member 330 is shown in its furthest position, relative to plug 315. Biasing member 340, being in compression in this configuration, presses against both support member 330 and plug 315. Limit member 335 is configured to permit support member 330 to move toward plug 315, when the pressure acting on the exterior of membrane 310 exceeds the resistance force provided by the support medium 305, the membrane 310, the biasing force of biasing member 340, any force exerted by the gas (if any) filling up the remaining space in cavity 320, etc. The manner in which limit member 335 permits support member 330 to approach plug 315 may be one of several possible mechanisms. Limit member 335 may be a simple flexible cable connecting the two elements, which collapses when the pressure differential across the membrane, from the pressurized system fluent material to the interior becomes positive.

Alternatively, limit member 335 and support member 330 together may form a rigid piston, with the right end of limit member 335 passing through a suitable aperture (not shown) in plug 315. As a still further alternative, limit member 335 may be formed from a series of telescoping tubes, which collapse under compression, but can withstand the tension produced by the biasing member acting on the support member and the plug.

By varying such characteristics as the stiffness and compressibility of the support medium, and the spring rate of the biasing member, the overall "spring rate" of the accumulator/compensator can not only be made to be substantially infinite over a predetermined force range, but can, instead or in addition to such offset, be made non-linear in other areas of the force range, in order to produce damping effects and/or otherwise alter the dynamic response characteristics of the accumulator/compensator. One of ordinary skill in the art having the present disclosure before them will be able to obtain such modification of characteristics, to achieve accumulators having behaviors, without undue experimentation.

Figure 23:
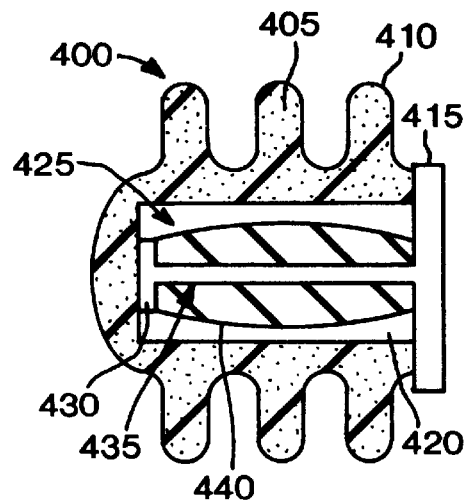
FIG. 23 is a schematic illustration, in section, of a preloaded accumulator according to another embodiment of the present invention.

FIG. 23 illustrates another accumulator/compensator 400, which is also provided with a preload. Accumulator 400 is likewise a closed-end accumulator. That is, the interior space of the SNF membrane is completely segregated from the surrounding environment.

A support medium 405, which may be a compressible material or a flowable, constant-volume material, is provided in membrane 410 of accumulator 400. The open end of membrane 410 is closed by a plug 415. In an interior cavity 420 of support medium 405 is provided a preload mechanism 425. Preload mechanism 425 includes support member 430, limit member 435 and biasing member 440, which in the embodiment of FIG. 23, may be a resilient and/or elastic cylinder or possibly a precharged flexible chamber (bellows, shock absorber) surrounding limit member 435. Biasing member 440 may be fabricated from an elastomeric material, a metal or ceramic mesh or other suitable material. Preload mechanism 425 is shown in its steady state, preloaded configuration, in FIG. 23. Limit member 435 will be operably connected to plug 415 and to support member 430 in such a manner that, as illustrated, support member 430 and limit member 435 are movable, relative to plug 415. Support member 430 is shown in its furthest position, relative to plug 415. Biasing member 440, being in compression in this configuration, presses against both support member 430 and plug 415. Limit member 435 is configured to permit support member 430 to move toward plug 415, when the pressure acting on the exterior of membrane 410 exceeds the resistance force provided by the support medium 405 and membrane 410, the biasing force of biasing member 440, any force exerted by the gas (if any) filling up the remaining space in cavity 420, etc. The manner in which limit member 435 permits support member 430 to approach plug 415 may be one of several possible mechanisms. Limit member 435 may be a simple flexible cable connecting the two elements, which collapses when the pressure differential from the pressurized system fluent material to the interior becomes positive. Alternatively, limit member 435 and support member 430 together may form a rigid piston, with the right end of limit member 435 passing through a suitable aperture (not shown) in plug 415. As a still further alternative, limit member 435 may be formed from a series of telescoping tubes, which collapse under compression, but can withstand the tension produced by the biasing member acting on the support member and the plug.

Figure 24:
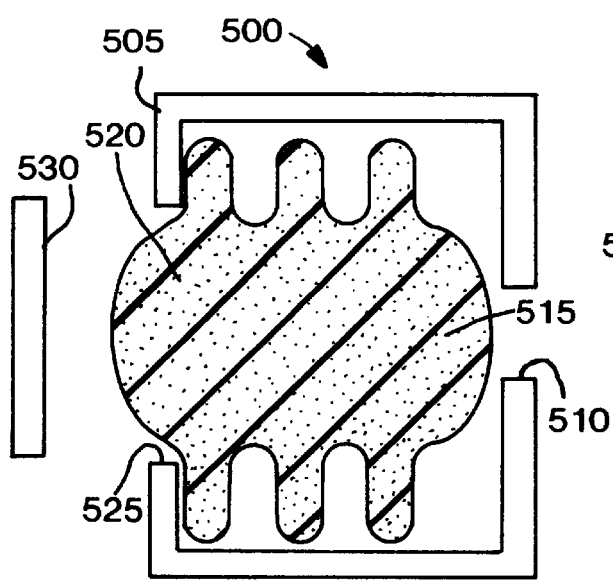
FIG. 24 is a schematic illustration, in section, of a preloaded accumulator according to still another embodiment of the present invention, in a partially assembled state.
Figure 25:
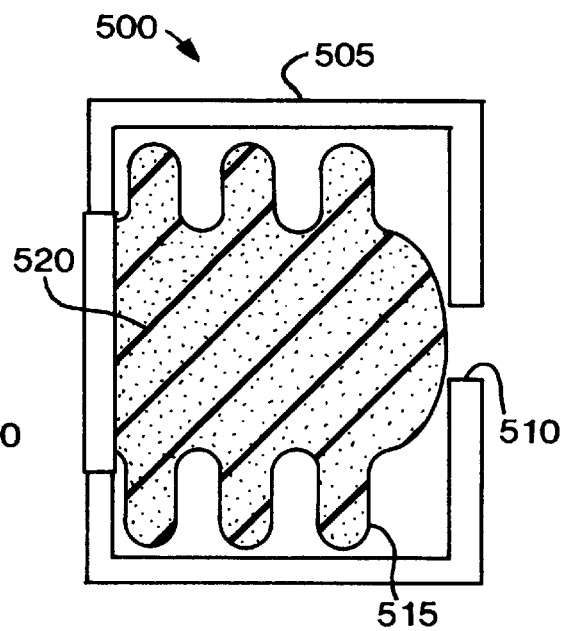
FIG. 25 is a schematic illustration, in section, of the preloaded accumulator of FIG. 24.

FIGS. 24 and 25 illustrate a further preloaded embodiment, in which accumulator 500 includes a housing 505, which is connected to the system fluent material, via aperture 510. The construction and assembly of accumulator 500 is shown schematically and conceptually in FIGS. 24 and 25, and additional manufacturing steps may be inserted or applied, as may be necessary in order to meet the requirements of any particular application, by one of ordinary skill in the art, having the present disclosure before them.

Membrane 515, with support medium 520 already in place within it, is positioned within incomplete housing 505. In addition to system fluent material aperture 510, housing will also have aperture 525. Support medium 520, which may be a compressible medium, or a constant-volume, flowable medium with an internal cavity (not shown), is provided in excess, so that the medium, in an unloaded state, extends out of the open end of membrane 515. The open end of the membrane 515 preferably is sealingly attached to the periphery of aperture 525. To complete the construction of the accumulator, a plug 530, is applied to the open end of the membrane and to aperture 525. The "excess" support medium is, in this process, compressed into the membrane 515. Preferably, membrane 515 will be sized, with respect to housing 505, so that membrane 515 will be limited in the amount which it will expand, in response to the compression of the support medium, so that the support medium will still remain in a somewhat compressed state, even though the accumulator is not in an externally loaded condition.

FIGS. 28–32 illustrate embodiments of the invention in which the accumulator/compensators have nonlinear responses.

Figure 29:
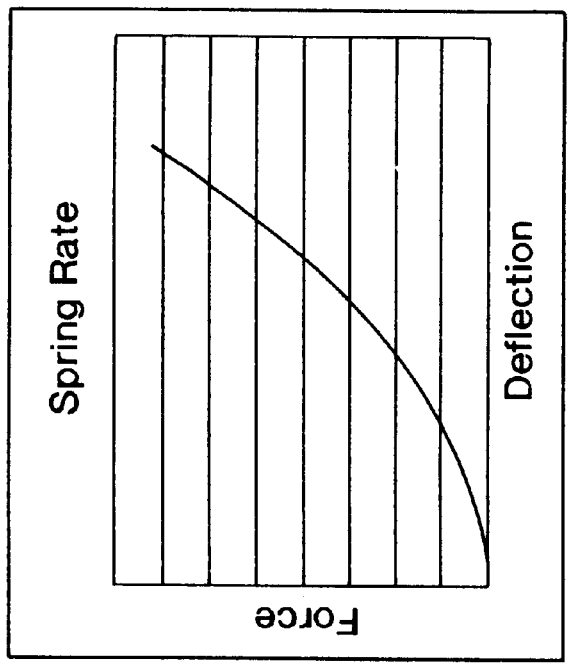
FIG. 29 is a typical plot of force versus deflection for an accumulator/compensator according to the embodiment of FIG. 28.
Figure 28:
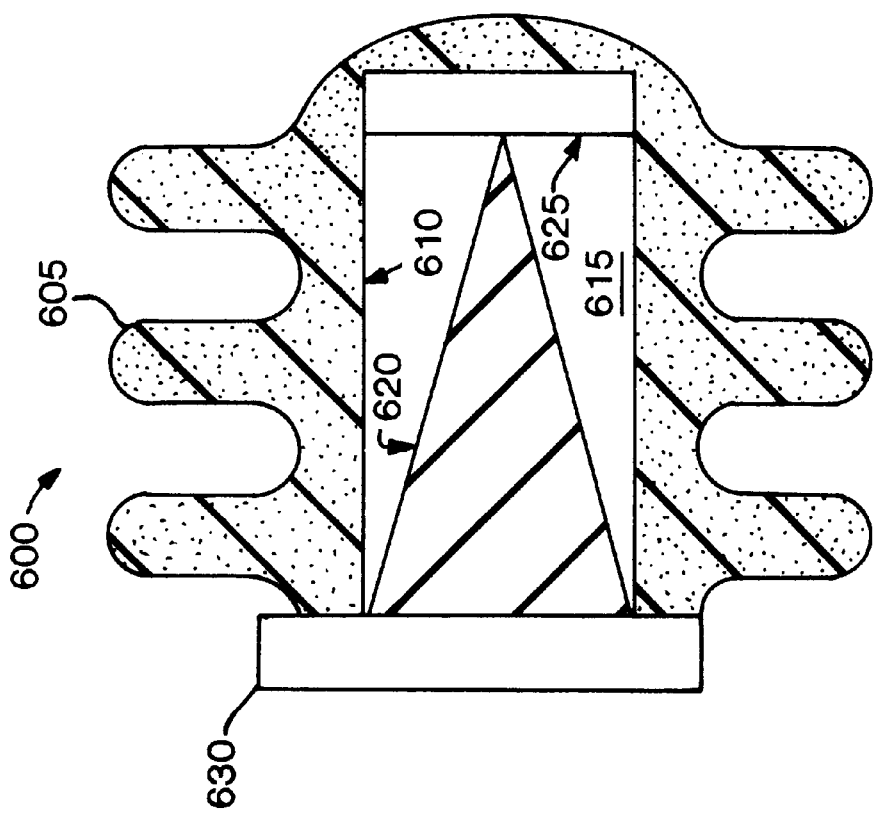
FIG. 28 is a schematic illustration of an accumulator/compensator according to another embodiment of the invention, which provides nonlinear response.

In the embodiment of FIG. 28 (in which the housing has been omitted from the illustration, but which is understood to be present in one of the several forms previously described herein), accumulator 600 includes membrane 605, support medium 610, internal cavity 615, nonlinear "spring" element 620, support member 625 and plug 630, which is sealing connected to membrane 605. In this embodiment, the nonlinear spring element works with the spring force of the membrane 605 and the support medium 610. Support medium 610 and spring element 620 may be the same material or different materials. In addition, the material of spring element 620 may or may not be homogenous. As system pressure external to membrane 605 increases, the combined spring rate results in a force v. deflection plot as shown in FIG. 29.

Figure 31:
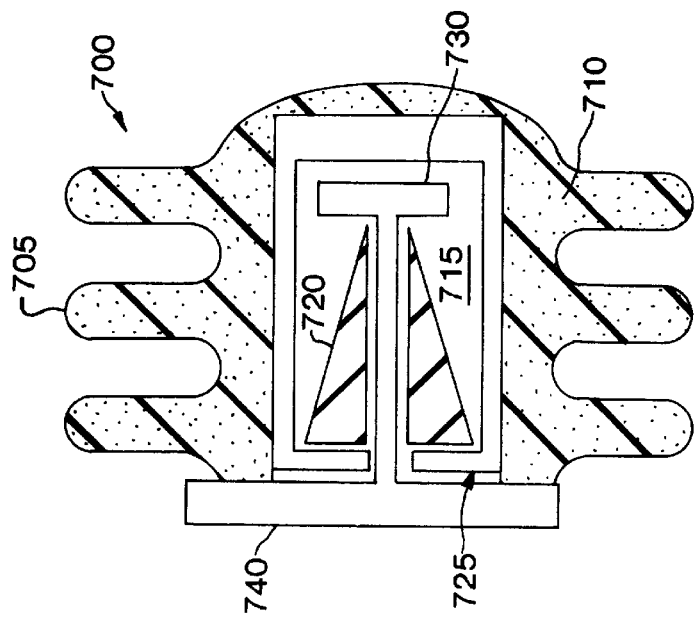
FIG. 31 is a schematic illustration of the accumulator/compensator of FIG. 30, shown in a compressed state.
Figure 32:
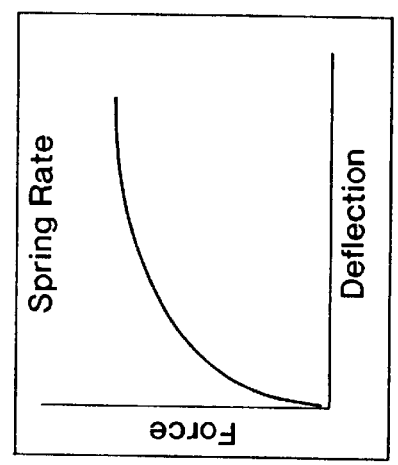
FIG. 32 is a typical plot of force versus deflection for an accumulator/compensator according to the embodiments of FIGS. 30–31.
Figure 30:
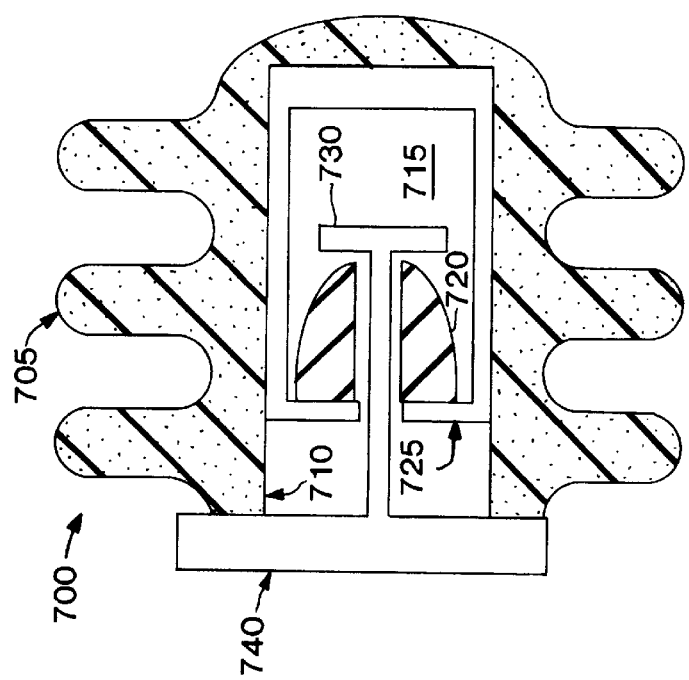
FIG. 30 is a schematic illustration of an accumulator/compensator, according to another embodiment of the invention, shown in a relaxed state, which accumulator/compensator provides nonlinear response.

FIGS. 30–32 illustrate a further nonlinear accumulator/compensator. Accumulator 700 includes membrane 705, support medium 710, internal cavity 715, nonlinear spring element 720, support member 725, compression member 730, and plug 740. Compression member 730 may be affixed to plug 740, and may have a T-shaped cross-sectional configuration. Spring element 720, in turn, may have a generally conical configuration, with a central aperture therethrough. Support member 725, may be in the form of a hollow cylindrical or rectangular structure, for example, with an aperture disposed in one end, through which the shaft of compression member 730 passes. Spring element 720 may be thus captured between the "crossbar" of the "T" of compression member 730, and an end wall of support member 725. The spring force of the nonlinear spring element works against the spring force of the membrane and support medium. The accumulator/compensator 700 will be installed so that initially when the accumulator/compensator is relaxed (FIG. 30), the nonlinear spring element is compressed. As system pressure rises and the accumulator/compensator is compressed (FIG. 31), the nonlinear spring element is relaxed, resulting in the combined spring rate plot as shown in FIG. 32. Although particular shapes and configurations for the support members, spring elements and compression members are discussed herein, it is to be understood that such configurations may be varied by one of ordinary skill in the art, having the present disclosure before them, without departing from the scope of the present invention.

An important aspect of the accumulators of the present invention, is that the choice of materials to be used for the support medium (compressible and/or incompressible material, with or without internal cavities and/or spring elements or other biasing members) may be altered by one of ordinary skill in the art, having the present disclosure before them, in accordance with the desired/required performance characteristics of any particular application. That is, compressible materials can be used anywhere incompressible materials are used, the reverse also being true, except that for incompressible materials, a space or cavity must be provided, or an opening to ambient, to provide a place for the incompressible material to flow. In addition, liquids and/or slurries may be used in conjunction with more solid support materials in any of the foregoing embodiments. The terms "support medium" and "support media" are intended to encompass each and all of the combinations of support materials, as long as at least one solid or semisolid material is employed.

A common aspect of each of the embodiments discussed or contemplated herein is the use of a non-gaseous support medium or media, segregated by a relatively thin-walled, substantially non-permeable, flexible membrane in communication with the pressurized fluent material system, so that protection is provided against escape of the system fluent material to ambient or into contact with the support media. In preferred embodiments of the invention, the accumulator components will be advantageously selected and sized so that the support media bears the brunt of the loading caused by the system fluent material, to "protect" the SNF membrane from the force pulsations of the system fluent material, while the SNF membrane protects the support media from the system fluent material. These configurations permit the use of lighter, simpler, less expensive and much more elastic, substantially non-permeable, flexible membrane structures, to provide pressure fluctuation absorption in pressurized fluent material systems over a wide range of operating pressure regimes. It is believed that accumulators constructed in accordance with the principles of the present invention can be constructed less expensively, and will function longer and more reliably under a wider range of applications, than prior art accumulator/compensator constructions.

In addition, the use of a non-porous membrane allows the use of less expensive support media that would otherwise be unacceptable or unattractive due to porosity of the support media or due to the incompatibility of the support media with the system fluent material (e.g., susceptibility to chemical attack).

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An accumulator/compensator apparatus for accommodating pressure fluctuations in a pressurized fluent material system, comprising:

a housing, operably configured to be connected, in communication with a pressurized fluent material system;

a substantially non-permeable, flexible membrane, fabricated as an inelastic, substantially flexible tubular member, operably disposed within the housing, to have a surface in contact with the system fluent material of the pressurized fluent material system, so that upon occurrence of a pressure differential across the substantially non-permeable, flexible membrane, caused by a change in the pressure of the system fluent material, the substantially non-permeable, flexible membrane will be prompted to undergo a change in dimension in response to the pressure change in the system fluent material contacting the surface of the substantially non-permeable, flexible membrane;

at least one non-gaseous support medium, operably disposed in operable contact with the substantially non-permeable, flexible membrane, for providing yielding resistance to dimensional change by the substantially non-permeable, flexible membrane in response to said pressure fluctuations of the system fluent material.

2. The accumulator/compensator apparatus according to claim 1, wherein the inelastic, substantially flexible tubular member forming the substantially non-permeable, flexible membrane comprises:

a bellows, having at least one open end, operably disposed substantially adjacent an opening in the housing, so that the open end of the substantially non-permeable, flexible membrane is exposed to ambient atmospheric conditions.

3. The accumulator/compensator apparatus according to claim 1, wherein the at least one non-gaseous support medium comprises:

a compressible, substantially self-supporting material.

4. The accumulator/compensator apparatus according to claim 1, wherein the at least one non-gaseous support medium comprises:
   an incompressible, flowable, substantially self-supporting constant volume material.

5. The accumulator/compensator apparatus according to claim 1, wherein at least one cavity is disposed in the support medium.

6. The accumulator/compensator apparatus according to claim 5, wherein a flow control structure is operably associated with the at least one cavity, for regulating flow of the gas in the internal cavity.

7. The accumulator/compensator apparatus according to claim 1, wherein the substantially non-permeable, flexible membrane comprises:
   a closed-ended bellows membrane structure, operably disposed within the housing.

8. The accumulator/compensator apparatus according to claim 7, wherein the closed-ended bellows membrane structure is substantially free-floating within the housing.

9. The accumulator/compensator apparatus according to claim 7, wherein the closed-ended bellows membrane structure is operably affixed to a surface of the housing.

10. The accumulator/compensator apparatus according to claim 1, wherein the at least one non-gaseous support medium further comprises one of the following materials: a liquid, a slurry.

11. The accumulator/compensator apparatus according to claim 1, wherein the at least one non-gaseous support medium is positioned substantially on the inside of the substantially non-permeable, flexible membrane, and the outside of the substantially non-permeable, flexible membrane is exposed to the system fluent material.

12. The accumulator/compensator apparatus according to claim 1, wherein the at least one non-gaseous support medium is positioned substantially on the outside of the substantially non-permeable, flexible membrane, and the inside of the substantially non-permeable, flexible membrane is exposed to the system fluent material.

13. The accumulator/compensator apparatus according to claim 1, further comprising at least one stop structure operably configured to limit the magnitude of dimensional changes made by the substantially non-permeable, flexible membrane in response to pressure fluctuations of the system fluent material.

14. The accumulator/compensator apparatus according to claim 1 wherein the apparatus is provided with a biasing preload such that the apparatus must encounter a pressure fluctuation in the system fluent material which is greater than a predetermined value before the substantially non-permeable, flexible membrane will undergo a change of dimension.

15. The accumulator/compensator apparatus according to claim 1 wherein the substantially non-permeable, flexible membrane and the non-gaseous support medium are cooperatively configured so that the change of dimension of the membrane will be nonlinear in response to the change in pressure of the system fluent material.

16. The accumulator/compensator apparatus according to claim 1, wherein the housing is a structure which is connectable to a preexisting fluent material containing component of the pressurized fluent material system.

17. The accumulator/compensator apparatus according to claim 1, wherein the housing is formed by a preexisting fluent material containing component of the pressurized fluent material system.

18. The accumulator/compensator apparatus according to claim 1, wherein the substantially non-permeable, flexible membrane and the non-gaseous support medium are cooperatively configured to produce at least one of a predetermined rate and amount of deflection of the membrane in response to at least one of a predetermined rate and value of pressure differential from a predetermined pressure encountered across the accumulator/compensator.

19. An accumulator/compensator apparatus for accommodating pressure fluctuations in a pressurized fluent material system, comprising:
   a substantially non-permeable, flexible membrane, fabricated as an inelastic, substantially flexible tubular member, operably disposed in communication with the system fluent material of a pressurized fluent material system, to have a surface in contact with the system fluent material of the pressurized fluent material system, so that upon occurrence of a pressure differential across the substantially non-permeable, flexible membrane, caused by a change in the pressure of the system fluent material, the substantially non-permeable, flexible membrane will be prompted to undergo a change in dimension in response to the pressure change in the system fluent material contacting the surface of the substantially non-permeable, flexible membrane;
   at least one non-gaseous support medium, operably disposed in operable contact with the substantially non-permeable, flexible membrane, for providing yielding resistance to dimensional change by the substantially non-permeable, flexible membrane in response to said pressure fluctuations of the system fluent material.

20. The accumulator/compensator apparatus according to claim 19, wherein the inelastic, substantially flexible tubular member forming the at least one non-gaseous support medium comprises:
   a compressible, substantially self-supporting material.

21. The accumulator/compensator apparatus according to claim 19, wherein the at least one non-gaseous support medium comprises:
   an incompressible, flowable, substantially self-supporting constant volume material.

22. The accumulator/compensator apparatus according to claim 19, wherein at least one cavity is disposed in the support medium.

23. The accumulator/compensator apparatus according to claim 22, wherein a flow control structure is operably associated with the at least one cavity, for regulating flow of the gas in the internal cavity.

24. The accumulator/compensator apparatus according to claim 19, wherein the at least one non-gaseous support medium further comprises one of the following materials: a liquid, a slurry.

25. The accumulator/compensator apparatus according to claim 19, wherein the at least one non-gaseous support medium is positioned substantially on the inside of the substantially non-permeable, flexible membrane, and the outside of the substantially non-permeable, flexible membrane is exposed to the system fluent material.

26. The accumulator/compensator apparatus according to claim 19, wherein the at least one non-gaseous support medium is positioned substantially on the outside of the substantially non-permeable, flexible membrane, and the inside of the substantially non-permeable, flexible membrane is exposed to the system fluent material.

27. The accumulator/compensator apparatus according to claim 19, further comprising at least one stop structure operably configured to limit the magnitude of dimensional changes made by the substantially non-permeable, flexible membrane in response to pressure fluctuations of the system fluent material.

28. The accumulator/compensator apparatus according to claim 19 wherein the apparatus is provided with a biasing preload such that the apparatus must encounter a pressure fluctuation in the system fluent material which is greater than a predetermined value before the substantially non-permeable, flexible membrane will undergo a change of dimension.

29. The accumulator/compensator apparatus according to claim 19 wherein the substantially non-permeable, flexible membrane and the non-gaseous support medium are cooperatively configured so that the change of dimension of the membrane will be nonlinear in response to the change in pressure of the system fluent material.

30. The accumulator/compensator apparatus according to claim 19, further comprising a housing which is connectable to a preexisting fluent material containing component of the pressurized fluent material system.

31. The accumulator/compensator apparatus according to claim 19, further comprising a housing formed by a preexisting fluent material containing component of the pressurized fluent material system.

32. The accumulator/compensator apparatus according to claim 19, wherein the substantially non-permeable, flexible membrane and the non-gaseous support medium are cooperatively configured to produce at least one of a predetermined rate and amount of deflection of the membrane in response to at least one of a predetermined rate and value of pressure differential from a predetermined pressure encountered across the accumulator/compensator.

* * * * *